United States Patent
Jarjoura et al.

(10) Patent No.: US 10,960,858 B2
(45) Date of Patent: Mar. 30, 2021

(54) AUTOMOTIVE PEDAL RELEASE SYSTEM

(71) Applicant: FLEX-N-GATE ADVANCED PRODUCT DEVELOPMENT LLC., Warren, MI (US)

(72) Inventors: Steve A. Jarjoura, Barrio (CA); Terry Reid, Oro-Medonte (CA); Ramesh Periasamy, Bradford (CA)

(73) Assignee: FLEX-N-GATE ADVANCED PRODUCT DEVELOPMENT LLC., Warren, MI (US)

( * ) Notice: Subject to any disclaimer, the term of this patent is extended or adjusted under 35 U.S.C. 154(b) by 0 days.

(21) Appl. No.: 16/390,887

(22) Filed: Apr. 22, 2019

(65) Prior Publication Data

US 2019/0322250 A1 Oct. 24, 2019

Related U.S. Application Data

(60) Provisional application No. 62/661,541, filed on Apr. 23, 2018.

(51) Int. Cl.
*B60T 7/06* (2006.01)
*G05G 1/327* (2008.04)
*G05G 1/44* (2008.04)

(52) U.S. Cl.
CPC ............ *B60T 7/065* (2013.01); *G05G 1/327* (2013.01); *G05G 1/44* (2013.01)

(58) Field of Classification Search
CPC .......... B60T 7/065; G05G 1/327; G05G 1/44; B60R 21/09; Y10T 70/5889; Y10T 74/20528; Y10T 74/20534; Y10T 74/20888
See application file for complete search history.

(56) References Cited

U.S. PATENT DOCUMENTS

| | | | |
|---|---|---|---|
| 6,951,152 B2* | 10/2005 | Strole | G05G 1/30 180/274 |
| 2007/0266815 A1* | 11/2007 | Johansson | G05G 1/30 74/512 |
| 2014/0311275 A1* | 10/2014 | Kim | G05G 1/44 74/512 |
| 2016/0054752 A1* | 2/2016 | Willemsen | G05G 1/44 74/512 |

FOREIGN PATENT DOCUMENTS

EP 3564081 A1 * 11/2019 ............ G05G 1/44

* cited by examiner

*Primary Examiner* — Vinh Luong
(74) *Attorney, Agent, or Firm* — Foley & Lardner LLP

(57) ABSTRACT

An automobile pedal release system that includes a housing having first and second side walls spaced apart by a cleft, where each side wall includes a pocket recessed into an inner surface such that the two pockets oppose one another; a brake pedal assembly having a pivot member disposed in the cleft and defining a pivot axis, first and second bushings, and a brake pedal arm rotatable about the pivot axis relative to the two bushings, where each busing is disposed in a first portion of one pocket and receives one of two ends of the pivot member; and a striker assembly having a striker and two plugs, the striker having an elongated body extending in the cleft between the side walls, where each plug is disposed in a second portion of one pocket and includes a bore that receives one of two ends of the striker.

17 Claims, 17 Drawing Sheets

AUTOMOTIVE PEDAL RELEASE SYSTEM

CROSS-REFERENCE TO RELATED PATENT APPLICATIONS

This application claims priority to and the benefit of U.S. Provisional Patent Application No. 62/661,541, filed Apr. 23, 2018. The aforementioned U.S. application is incorporated herein by reference in its entirety.

BACKGROUND

The present disclosure relates generally to the field of automotive pedal release systems. More specifically, this application relates to a pedal release system having a brake pedal that operatively disengages (e.g., becomes collapsible) during a dynamic vehicle event (e.g., vehicle collision or impact).

SUMMARY

At least one embodiment of the present application relates to an automobile pedal release system that include a housing, a brake pedal assembly, and a striker assembly. The housing has a first side wall and a second side wall, which opposes and is spaced apart from the first side wall by a cleft. Each of the first and second side walls includes a pocket recessed into an inner surface of the associated side wall such that the two pockets oppose one another. The brake pedal assembly includes a pivot member, which is disposed in the cleft and defining a pivot axis, first and second bushings, and a brake pedal arm rotatable about the pivot axis relative to the two bushings. Each busing is disposed in a first portion of one of the two pockets and receives one of two ends of the pivot member. The striker assembly includes a striker and two plugs, where the striker has an elongated body extending in the cleft between the first and second side walls. Each plug is disposed in a second portion of one of the two pockets and includes a bore that receives one of two ends of the striker.

At least one embodiment relates to an automobile pedal release system that includes a housing having a first side wall and a second side wall, which opposes and is spaced apart from the first side wall by a cleft; first and second side plates coupled to the first and second side walls, each side plate having a slotted opening; a pivot member disposed in the cleft, extending between the first and second side plates, and received in each slotted opening, the pivot member defining a pivot axis; a pivot tube receiving the pivot member such that the pivot tube is rotatable about the pivot axis; a brake pedal arm coupled to the pivot tube and configured to rotate about the pivot member relative to the housing; and a striker assembly comprising a striker bracket and a shear pin coupling the striker bracket to at least one of the side walls, wherein the shear pin is configured to shear in response to a threshold force allowing the pivot member to move within each slotted opening to move the pivot axis relative to the housing.

At least one embodiment of the present application relates to a pedal release system that includes an automotive pedal release system, whereby upon receiving a force to the system, the pedal assembly disengages as a safety precaution. The pedal release system may include a striker subassembly and a pedal housing.

In at least one embodiment, the pedal release system includes a brake pedal assembly, a pedal housing assembly, and a striker subassembly. The brake pedal assembly is partially received within the pedal housing assembly and pivots about a pivot member. The striker assembly couples with the pedal housing assembly and brake pedal subassembly, such that, in the event of a collision, the striker subassembly may receive a force acted upon it by an instrument panel of the vehicle. The striker subassembly is configured to collapse as a result of the forces acted upon it reaching a threshold force, allowing the brake pedal member to disengage from the pedal housing assembly. The brake pedal may fall towards the floor instead of exerting a force through the brake pedal arm.

In at least one embodiment, the striker subassembly includes at least two striker brackets coupled together using fasteners.

In at least one embodiment, a secondary striker subassembly extends above the pedal housing assembly and receive a force from the instrument panel in the event of a collision. The secondary striker subassembly may then pivot upward to allow the brake pedal assembly to disengage from the pedal housing assembly.

In at least one embodiment, the pedal housing assembly includes a pair of side plates having a slot and grooves, which couple with the brake pedal assembly. As the striker subassembly receives a force from the instrument panel in the event of a collision, the striker subassembly pivots upward to allow the brake pedal assembly to traverse the slots of the side plates and disengage from the pedal housing assembly.

This summary is illustrative only and is not intended to be in any way limiting. Other aspects, inventive features, and advantages of the devices and/or processes described herein, as defined solely by the claims, will become apparent in the detailed description set forth herein, taken in conjunction with the accompanying figures, wherein like reference numerals refer to like elements.

DETAILED DESCRIPTION

Pedal release systems can be implemented in automobiles or vehicles (e.g., motor, electric, hybrid, etc.) to protect vehicle occupants (e.g., reduce likelihood of injury) in the event of an impact or collision. For example, a frontal impact/collision of the vehicle (e.g., an impact to the front of a vehicle) can cause the front of the dashboard (FOD), e.g., below an instrument panel, to which pedals may be attached, to encroach upon a driver. If this occurs, the pedals may transfer the load from the impact into the driver's foot or leg, which may result in injury to the driver. The pedal release systems of this application include pedals that are configured to disengage in response to an impact (e.g., a threshold vehicle collision), which could cause encroachment of the FOD, such as by releasing the pedals to swing freely, to reduce or eliminate the risk of injury to the driver from pedal impact by reducing or eliminating the force transferred from the pedals to the driver.

Before turning to the FIGURES, which illustrate the exemplary embodiments in detail, it should be understood that the present application is not limited to the details or methodology set forth in the description or illustrated in the figures. It should also be understood that the terminology used herein is for the purpose of description only and should not be regarded as limiting.

Referring generally to the FIGURES, disclosed in this application are exemplary embodiments of automotive brake pedal release systems that advantageously simplify the complexity of the design and operation of the pedal release system, while additionally providing a means of reducing the risk of injury to a driver in the event of a collision.

Figure 1:
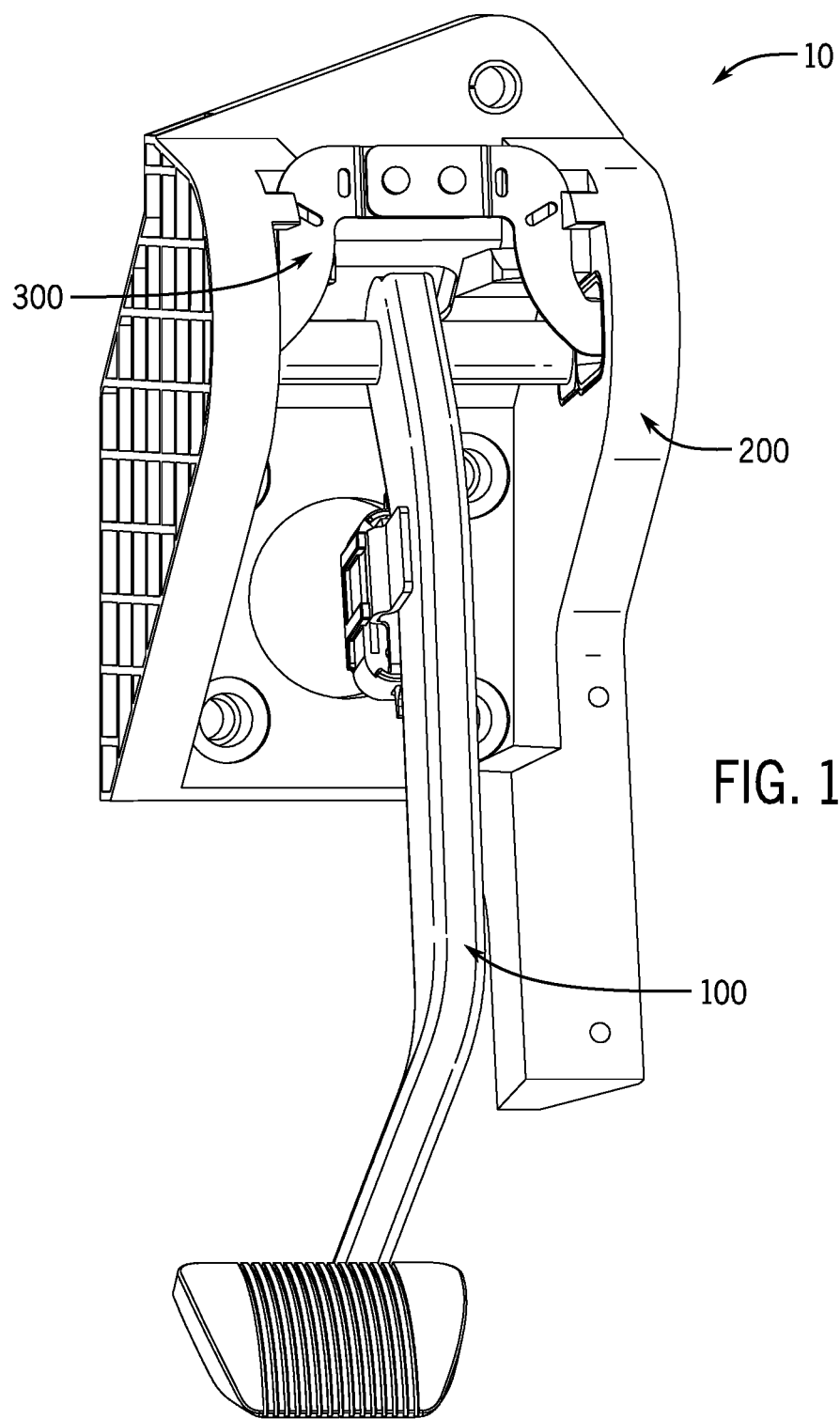
FIG. 1 is a perspective view of a pedal release system, according to the present disclosure.
Figure 2:
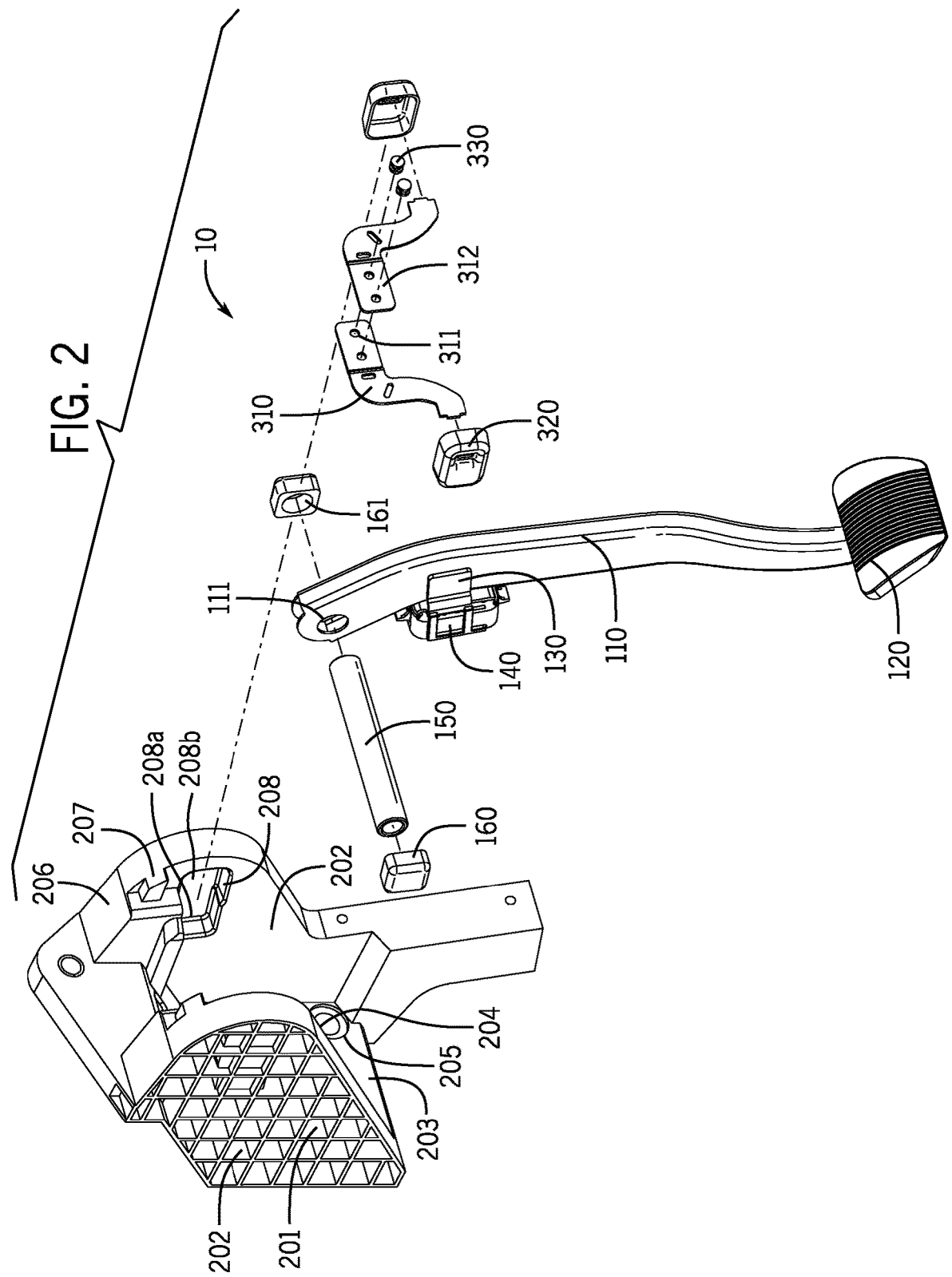
FIG. 2 is an exploded view of the pedal release system shown in FIG. 1.
Figure 3:
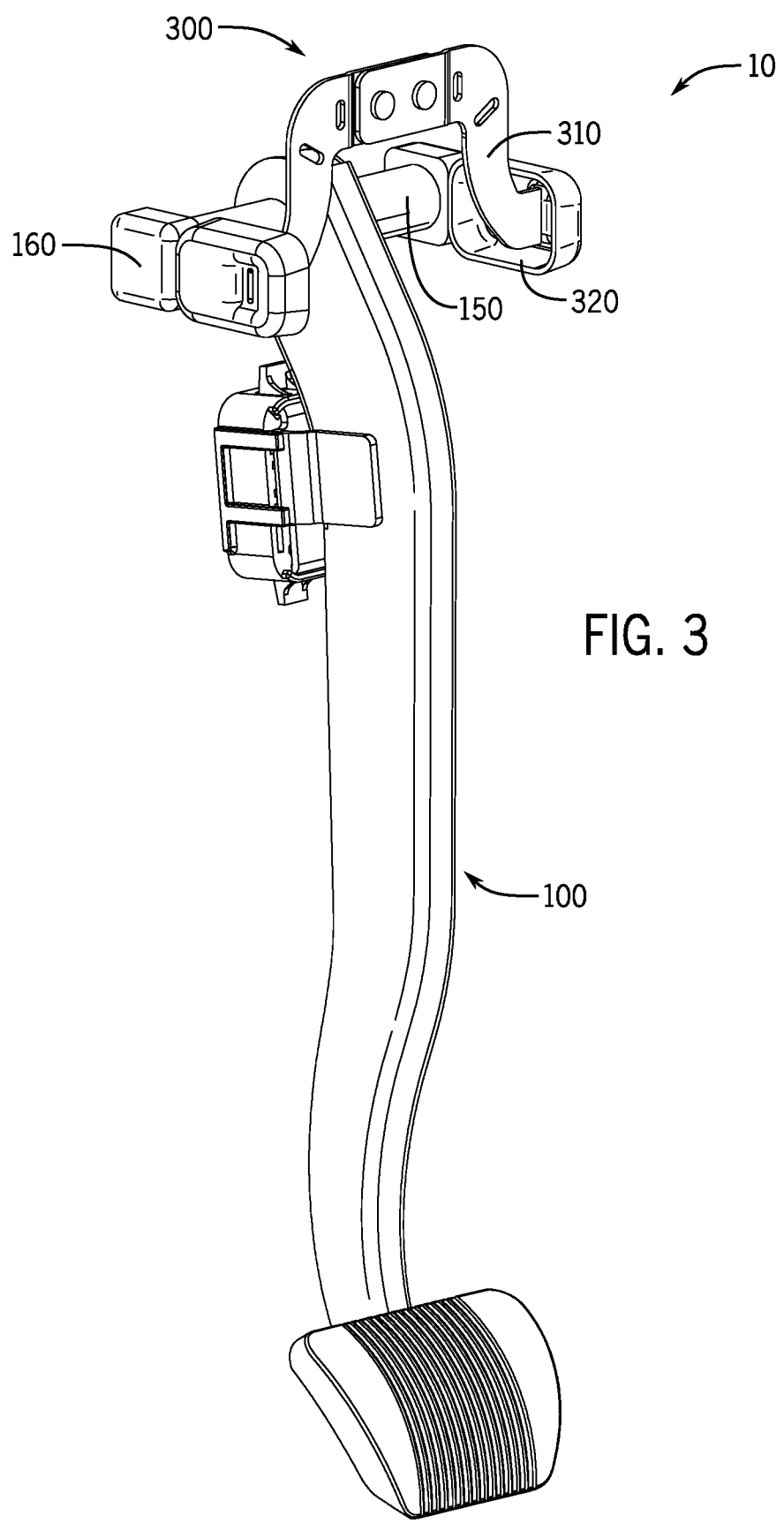
FIG. 3 is a perspective view of the pedal release system shown in FIG. 1 omitting the pedal assembly module housing to provide greater detail.
Figure 5:
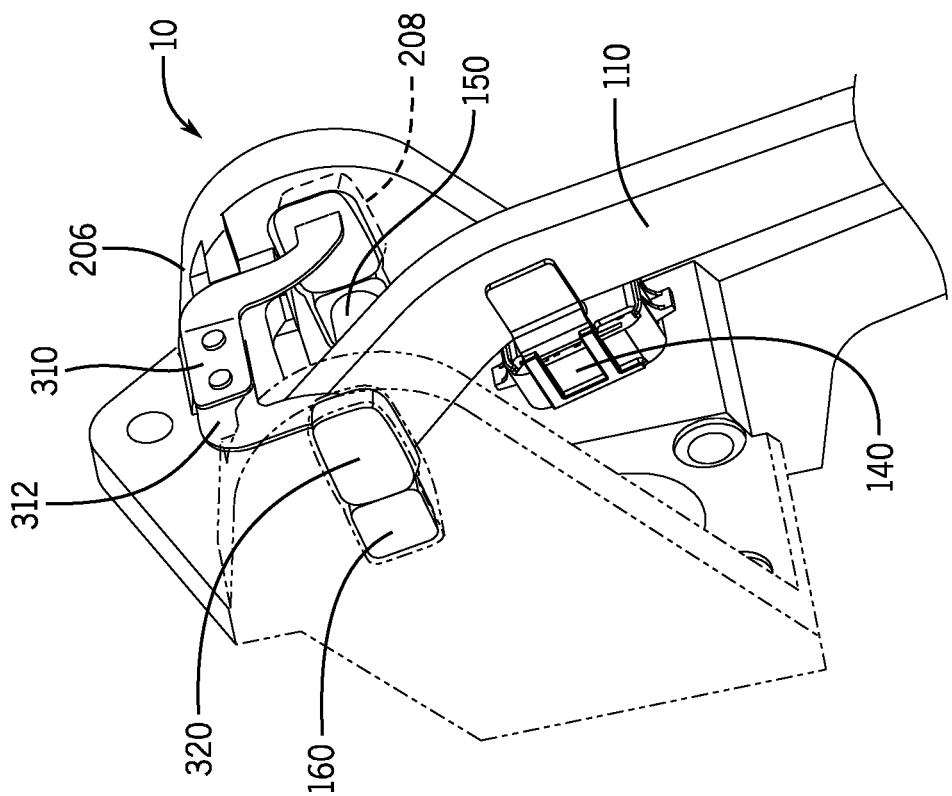
FIG. 5 is a perspective view of the pedal release system shown in FIG. 1 in a second operating position.
Figure 4:
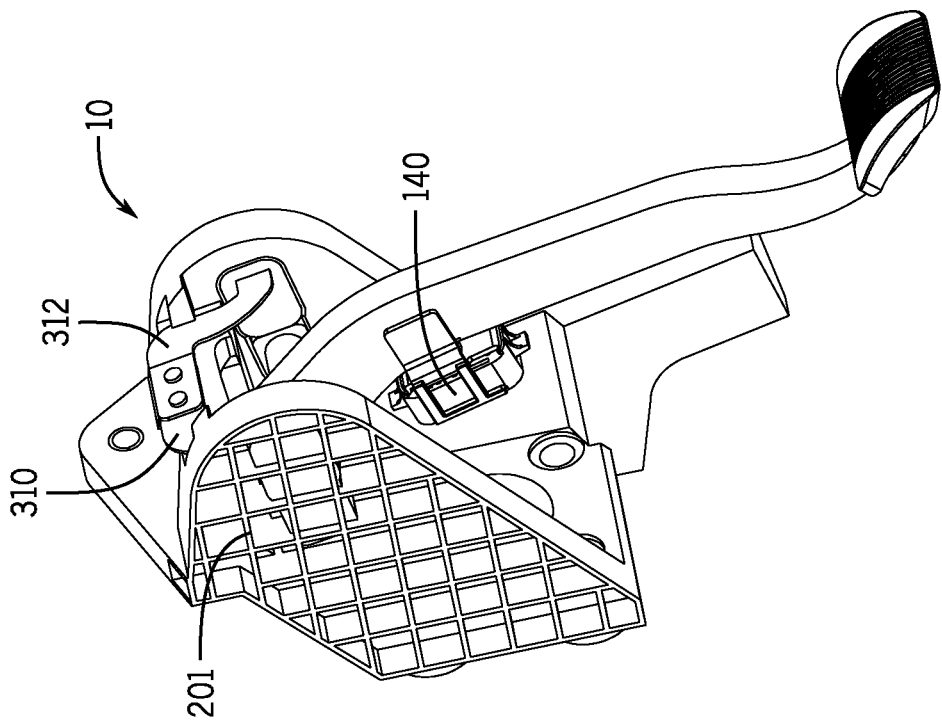
FIG. 4 is a perspective view of the pedal release system shown in FIG. 1 in a first (e.g., an initial) operating position.

FIGS. 1-3 illustrate an exemplary embodiment of a pedal release system 10 which includes a brake pedal assembly 100, a pedal housing assembly 200, and a striker subassembly 300. At least part of the brake pedal assembly 100 is housed within a pedal housing 201 of the pedal housing assembly 200, and mechanically engages with the striker subassembly 300 to enable the brake pedal assembly 100 to swing freely in the event if a threshold vehicle collision.

The illustrated brake pedal assembly 100 includes a brake pedal arm 110, a pedal 120 including a base and a pad (e.g., rubber pad) coupled to the base, a booster rod retainer bracket 130, a booster rod retainer 140, a pivot member 150 (e.g., pivot pin), and two pivot bushings 160. The brake pedal arm 110 includes a through hole 111 (e.g., aperture) at an upper end of the brake pedal arm 110, within which the pivot member 150 is received either pivotally to allow the brake pedal arm 110 to rotate about a pivot axis of the pivot member 150 or fixedly (e.g., welded, joined, etc.) to allow the pivot member 150 and pedal arm 110 to rotate together about the pivot axis. The pedal plate 120 is disposed at a lower end of the brake pedal arm 110, which is distal the through hole 111, and is configured to receive a force or input from a driver. The booster rod retainer bracket 130 is fixedly coupled to a forward (i.e., closest to the front of the vehicle) side of the brake pedal arm 110, and the booster rod retainer bracket 130 receives and couples to the booster rod retainer 140, which is configured to receive a force from a booster rod (not shown). The brake pedal arm 110, the pedal plate 120, the booster rod retainer bracket 130, and the pivot member 150 may be made of or include any suitable material (e.g., a metal or other similar material). The booster rod retainer 140 and the pivot bushings 160 may be made of or include any suitable material (e.g., a plastic or other similar material).

The pivot member 150 is shown having a generally cylindrical shape (e.g., a hollow tube) that complements the shape of the through hole 111 in the brake pedal arm 110. The pivot member 150 extends through the through hole 111 to allow the brake pedal arm 110 to pivot (e.g., rotate) about the pivot member 150. As shown in FIG. 2, each of the two pivot bushings 160 receives and supports one end of the pivot member 150 in a recess 161 (e.g., bore) of the busing 160 extending into the side/surface closest to the brake pedal arm 110. The illustrated recess 161 has a circular shape which is sized to receive (e.g., slightly larger than) the pivot member 150, so that the pivot member 150 may rotate within the pivot bushing 160. The recess 161 may have a different shape, such as a rectangular cross section to receive a complementary shaped end of the pivot member to prevent relative rotation between the pivot member and the bushings.

The illustrated pedal housing assembly 200 includes a pedal housing 201, having a pair of parallel and vertically extending side walls 202, which are connected by a vertically extending forward wall 203. The pedal housing 201 may be made of or include, for example, plastic or metal. As shown in FIG. 2, the forward wall 203 includes at least one aperture 204, and the illustrated aperture 204 receives a front of a dash bushing 205. In this way, the pedal housing assembly 200 may be fixedly coupled to the dash of a vehicle by securing a fastener through the aperture 204 disposed in the forward wall 203 and the dash bushing 205.

Each illustrated side wall 202 includes a forward interface 206 (e.g., first protrusion) and a rear interface 207 (e.g., second protrusion), which are shown as protrusions extending inwardly from an upper portion of the side wall 202. The forward interface 206 is closer to the forward wall 203 (i.e., the front of the vehicle) than the rear interface 207. Each illustrated side wall 202 also includes a pocket 208 integrally formed in an inner surface of the side wall 202 to receive one pivot bushing 160. Each pocket 208 is defined by top and bottom surfaces, which may extend substantially parallel from one another. Each pocket 208 includes two portions, including a first portion 208a, which is disposed closer to the forward wall 203 than a second portion 208b. The first portion 208a has substantially the same general size and shape as the perimeter of the pivot bushings 160. In this way, one pivot bushing 160 can be received within one pocket 208, such as in the first portion 208a.

The illustrated striker subassembly 300 includes a striker bracket 310, striker plugs 320, and striker fasteners 330 (e.g., striker rivets). The striker bracket 310 can be a single bracket or two or more brackets operatively coupled together. For example, the striker bracket 310 may include a pair of mating striker brackets that are fixedly coupled tougher with one or more striker fasteners 330. The striker brackets, when coupled, may together form a top horizontal portion and may extend vertically downward at either or both ends. The striker brackets 310 may include at least one through hole 311 on a front surface 312, which receives a striker fastener 330. The striker brackets 310 may be fixedly coupled to the striker plugs 320 at the outer ends. For example, an inner surface (i.e., closest to the striker brackets 310) of the striker plugs 320 may contain a slot within which to receive the ends of the striker brackets 310. In addition, while the striker brackets 310 and striker plugs 320 are described as separate components, the striker brackets 310 can alternatively be integrally formed with the striker plugs 320, such as by over-molding the plugs 320 onto the bracket(s). The striker brackets 310 and the striker plugs 320 may be made of or include, for example, metal or plastic.

The brake pedal assembly 100 and striker subassembly 300 may both be at least partially disposed within the pedal housing assembly 200. During installation, the illustrated striker brackets 310 are coupled using one or more striker fasteners 330, as described above. The striker plugs 320 are coupled to the outer ends of the striker brackets 310. In addition, a portion (e.g., the top section) of the striker bracket 310 is disposed in a channel between the forward interface 206 and the rear interface 207 of the pedal housing 201. The striker plugs 320 are received within the pockets 208 of the pedal housing 201. Specifically, the second portion 208b of the pocket 208 has substantially the same general size and shape as the perimeter of the striker plug 320. In this way, the striker plugs 320 can be press fit or received within the second portion 208b of the pocket 208, with an associated pivot bushing 160 received within the first portion 208a of the pocket 208. In this way, the pivot bushings 160 and striker plugs 320 may abut one another within the pocket 208 when installed. When the brake pedal assembly 100 is installed in this way, the pivot member 150 extends generally parallel to the forward wall 203 of the pedal housing 201. Since the brake pedal assembly 100 is configured to pivot about the pivot member 150, the brake pedal assembly 100 may rotate forward (i.e., towards the front of the vehicle), such that the pedal plate 120 would rotate towards the forward wall 203 of the pedal housing 201 when a user applies a force to the pedal plate 120. The booster rod (not shown), being installed forward of the brake pedal assembly 100, would conversely apply a force to the booster rod retainer 140.

FIGS. 4-7 help illustrate the operation of the pedal release system 10 during a collision event. In the event of a threshold impact to the front of the vehicle, the pedal housing 201 is forced rearward (i.e., into the passenger cabin of the vehicle), causing a front surface 312 of each striker bracket 310 to apply a force into an instrument panel (not shown). As the striker bracket 310 and instrument panel collide, a back surface of the striker bracket 310 can be forced to abut the forward interface 206. In addition, the rearward force from the booster rod (not shown) onto the booster rod retainer 140 can cause a rearward force to be exerted by the brake pedal assembly 100. In this way, the pivot member 150 and the pivot bushings 160 can apply a rearward force against the striker plugs 320 within the pockets 208 of the pedal housing 201. This force may cause both the pivot bushings 160 and striker plugs 320 to translate rearward within the pockets 208, and abut a rearward end of the pockets 208 (see FIG. 4).

Figure 7:
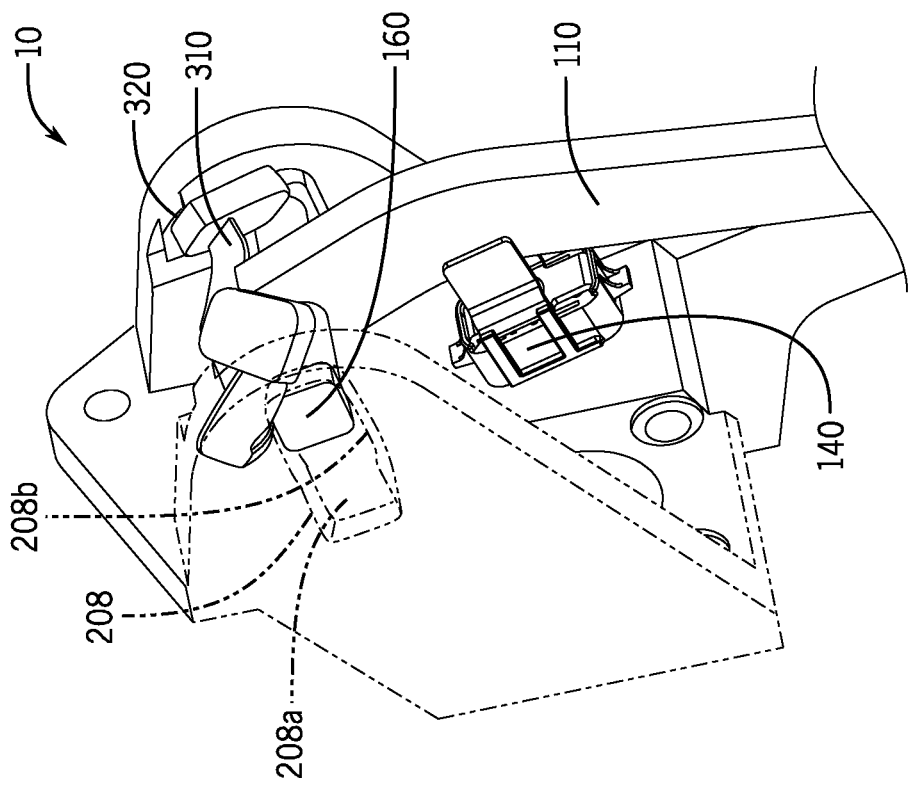
FIG. 7 is a perspective view of the pedal release system shown in FIG. 1 in a fourth (e.g., a final) operating position.
Figure 6:
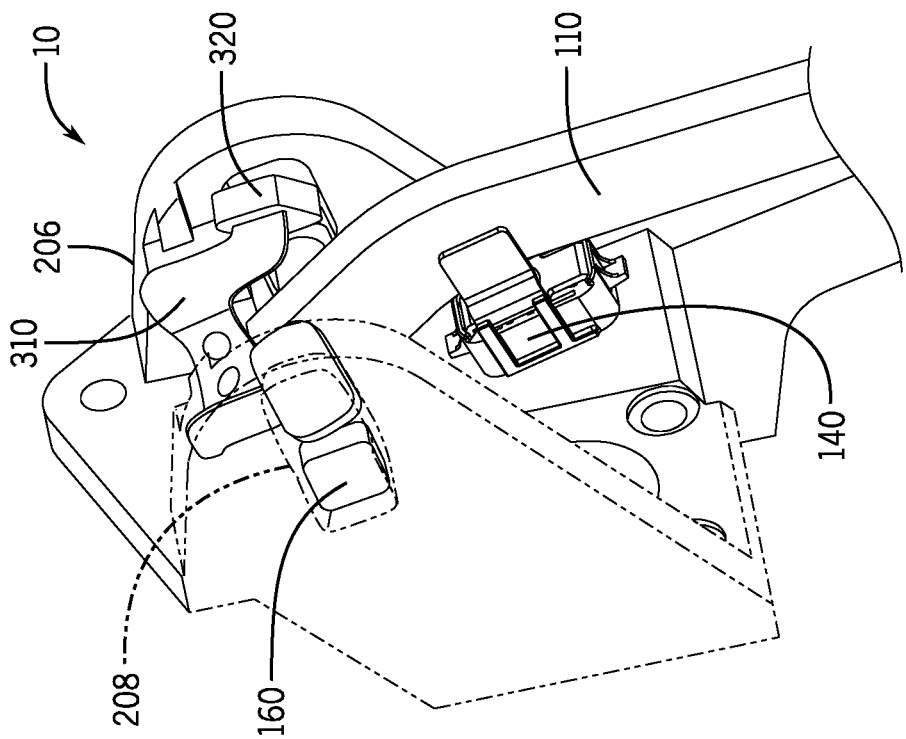
FIG. 6 is a perspective view of the pedal release system shown in FIG. 1 in a third operating position.

Also shown in FIGS. 6 and 7, the striker subassembly 300 can experience a force or loading during a dynamic event. For example, the striker plugs 320 can be loaded by the abutting bushings 160 of the brake pedal assembly 100 and/or a surface of the striker bracket 310 can be loaded by the forward interface 206 and/or rearward interface 207 of the pedal housing 201. A force, which may be an opposing force, applied from the instrument panel (i.e., as applied to a surface of the striker bracket 310) can cause the striker brackets 310 to begin to collapse (e.g., buckle). Specifically, the striker bracket(s) 310 may buckle inward as the interface 206 abuts the outer ends of the striker brackets 310. The rearward translational force applied to the striker plugs 320, coupled with the decreasing holding pressure from the striker brackets 310 allows the striker plugs 320 to begin to move toward removably disengaging from the pocket 208. The force (e.g., translational force) from the pivot bushings 160 (and pedal assembly) push the striker plugs 320 out of the pockets 208, such that the striker brackets 310 allow the striker plugs 320 to dislodge (e.g., fully disengage, operatively disengage, etc.) from the pockets 208 (e.g., the second portion 208b). The pivot bushings 160 are then able to slide from the first portion 208a to the second portion 208b, which was previously occupied by the striker plugs 320. The second portion 208b may have a large surface area than that of the first portion 208a. In this way, when the pivot bushings 160 are moved into the second portion 208b, they may be able to rotate within the pocket 208. In this new position, the brake pedal assembly 100 (e.g., the brake pedal arm 110) can rotate (about the new pivot axis) toward the floor of the vehicle about the booster connection. That is, by moving into the pocket 208, the pedal assembly 100 is allowed to rotate (e.g., about the new or second pivot axis after moving) to the floor of the vehicle about the booster connection, such as the booster rod retainer 140 and/or the booster rod retainer bracket 130. In this way, the disengagement of the brake pedal assembly 100 may prevent the pedal release system 10 from acting as a rigid member by exerting the force of the collision through the brake pedal assembly 100, as it may when it is engaged.

Figure 8:
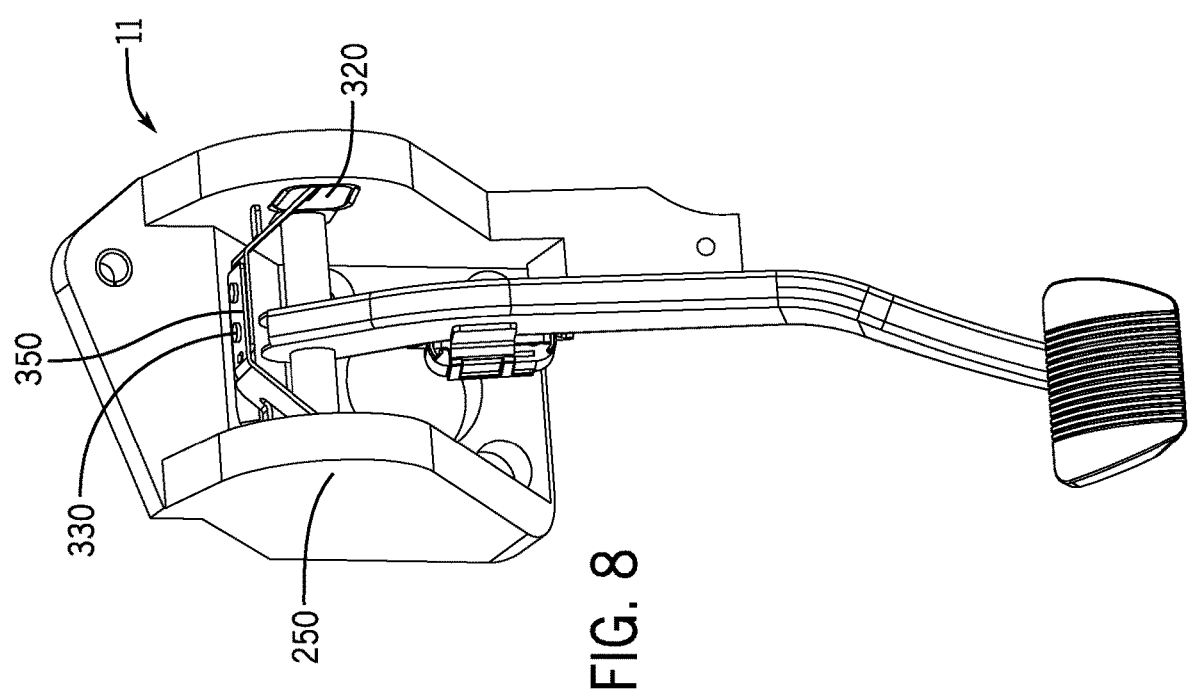
FIG. 8 is a perspective view of an alternate embodiment of the pedal release system shown in FIG. 1, according to the present disclosure.
Figure 11:
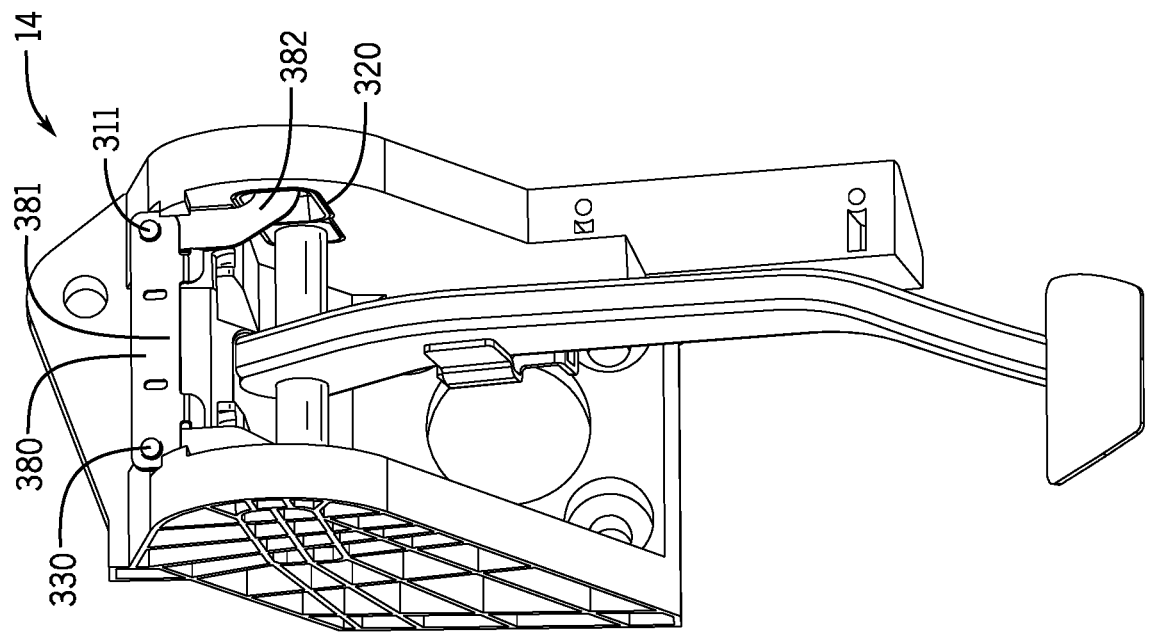
FIG. 11 is a perspective view of an alternate embodiment of the pedal release system shown in FIG. 1, according to the present disclosure.

FIG. 8 illustrates an exemplary embodiment of a pedal release system 11, which is substantially similar to the pedal release system 10 described above, except for some changes to the striker subassembly 300 and the pedal housing assembly 200. Specifically, the striker brackets 350 of pedal release system 11 may consist of a pair of mating striker brackets 350, which are fixedly coupled together using one or more striker fasteners 330. The striker brackets 350 when coupled together form a top horizontal portion and legs that extend vertically downward at either end thereof. The striker brackets 350 include at least one through hole 311 on a top surface 312, which receives striker fasteners 330. The striker brackets 350 may fixedly couple to the striker plugs 320 at the outer ends. For example, an inner surface (i.e., closest to the striker brackets 350) of the striker plugs 320 has a slot within which receives the ends of the striker brackets 350. In addition, pedal release system 11 may include a pedal housing 250 instead of pedal housing 201, as described in pedal release system 10. However, the pedal housing 201 and pedal housing 250 may be substantially similar, except the pedal housing 250 may omit the forward interface 206 and the rear interface 207. In this way, it should be appreciated that the operation of the pedal release system 11 may be substantially similar to that of the pedal release system 10 (i.e., as described in FIGS. 4-7). However, impact of the instrument panel on the striker brackets 350 and of the pivot bushings 160 on the striker plugs 320 may cause the striker bracket 350 to collapse, without the aid of the forward interface 206.

Figure 9:
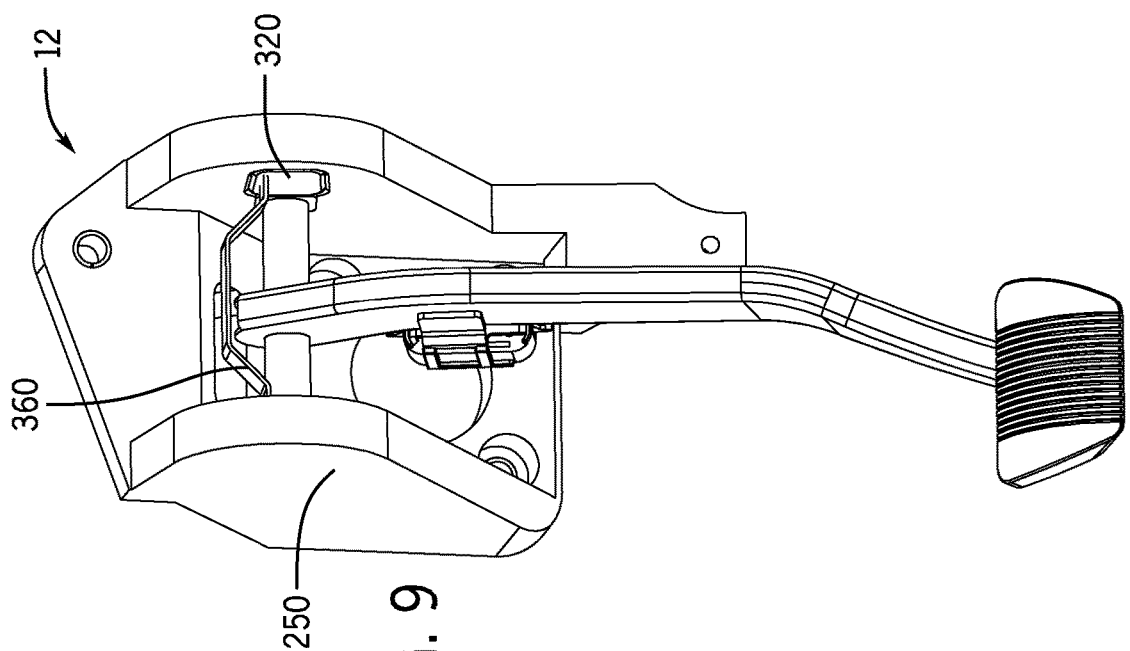
FIG. 9 is a perspective view of an alternate embodiment of the pedal release system shown in FIG. 1, according to the present disclosure.

FIG. 9 illustrates another exemplary embodiment of a pedal release system is shown. Pedal release system 12 is substantially similar to pedal release system 11 described above, except pedal release system 12 includes striker bracket 360 instead of striker brackets 350. Specifically, the striker brackets 350 included a pair of mating striker brackets 350, which fixedly coupled by way of striker fasteners 330. However, striker bracket 360 is instead integrated into one bracket 360. In other words, striker bracket 360 has a top horizontal portion and ends that extend vertically downward from the top horizontal portion. The striker bracket 360 may be fixedly coupled to the striker plugs 320 at the outer ends. For example, an inner surface (i.e., closest to the striker bracket 360) of the striker plugs 320 contains a slot that receives the ends of the striker bracket 360. In addition, the pedal release system 12 has a pedal housing 250, which can be configured as described above except where noted. In this way, it should be appreciated that the operation of the pedal release system 12 is substantially similar to that of pedal release system 10 (i.e., as described in FIGS. 4-7). However, impact of the instrument panel on the striker bracket 360 and of the pivot bushings 160 on the striker plugs 320 can cause the striker bracket 360 to collapse without the aid of the forward interface 206.

Figure 10:
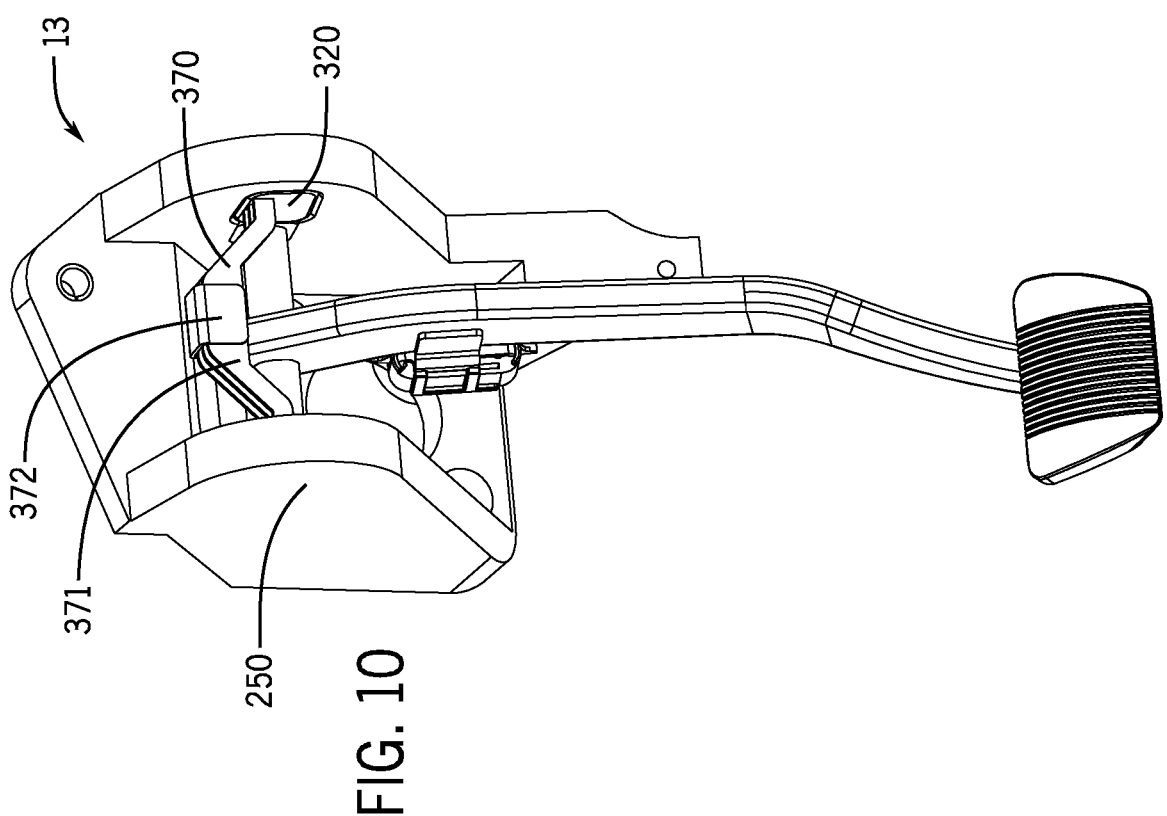
FIG. 10 is a perspective view of an alternate embodiment of the pedal release system shown in FIG. 1, according to the present disclosure.

FIG. 10 illustrates another exemplary embodiment of a pedal release system 13, which is substantially similar to the pedal release systems described above (e.g., the pedal release system 10), except where noted. The striker subassembly includes a plurality of striker brackets, where the plurality of striker brackets has a front surface which extends substantially vertically, and wherein the plurality of striker brackets are substantially parallel to the back wall of the pedal assembly module housing. The striker subassembly has a connector 372 fixedly coupled to a plurality of striker brackets 370. The striker brackets 370 extend generally vertically and may abut along parallel faces, such that they are stacked. The plurality of mating striker brackets 370 may directly abut one another, or alternatively, may have a gap between each pair of adjacent and parallel set of brackets 370. The connector 372 may couple the plurality of mating striker brackets 370 at a top portion 371 of each striker bracket 370. Each illustrated top portion 371 extends horizontally, and may extend vertically downward at either end. The striker brackets 370 fixedly couple to the striker plugs 320 at the outer ends. For example, an inner surface (i.e., closest to the striker brackets 370) of the striker plugs 320 have one or more corresponding slots within which to receive the ends of the striker brackets 370. In addition, the illustrated pedal release system 13 includes a pedal housing 250, which is similar to that described above for the pedal release system 11. In this way, it should be appreciated that the operation of the pedal release system 13 may be substantially similar to that of pedal release system 10 (i.e., as described in FIGS. 4-7). However, impact of the instrument panel on the striker brackets 370 and connector 372, and of the pivot bushings 160 on the striker plugs 320, may cause the striker brackets 370 to collapse without the aid of the forward interface 206.

illustrates another exemplary embodiment of a pedal release system 14, which is similar to pedal release system 10 described above, except where noted. For example, the system 14 can include a striker subassembly like the striker subassembly 300, but including three components (e.g., parts, pieces, elements, etc.). Specifically, each striker bracket 380 of pedal release system 14 has an upper, horizontally extending bracket 381, which couples at either outer to a downwardly extending bracket 382. Horizontal bracket 381 has apertures 311 at either outer end for fixedly coupled to the downwardly extending brackets 382 (which may have apertures 311 at an upper end) via one or more striker fasteners 330. The striker brackets 380 when coupled together form a top horizontal portion along with sides extending downward at either end. The striker brackets 382 can fixedly couple to the striker plugs 320 at the lower, outer ends. For example, an inner surface (i.e., closest to the striker brackets 382) of the striker plugs 320 may contain a slot, which receives an end of one or more striker brackets 382. In this way, it should be appreciated that the operation of the pedal release system 14 may be substantially similar to that of pedal release system 10 (i.e., as described in FIGS. 4-7).

Figure 12:
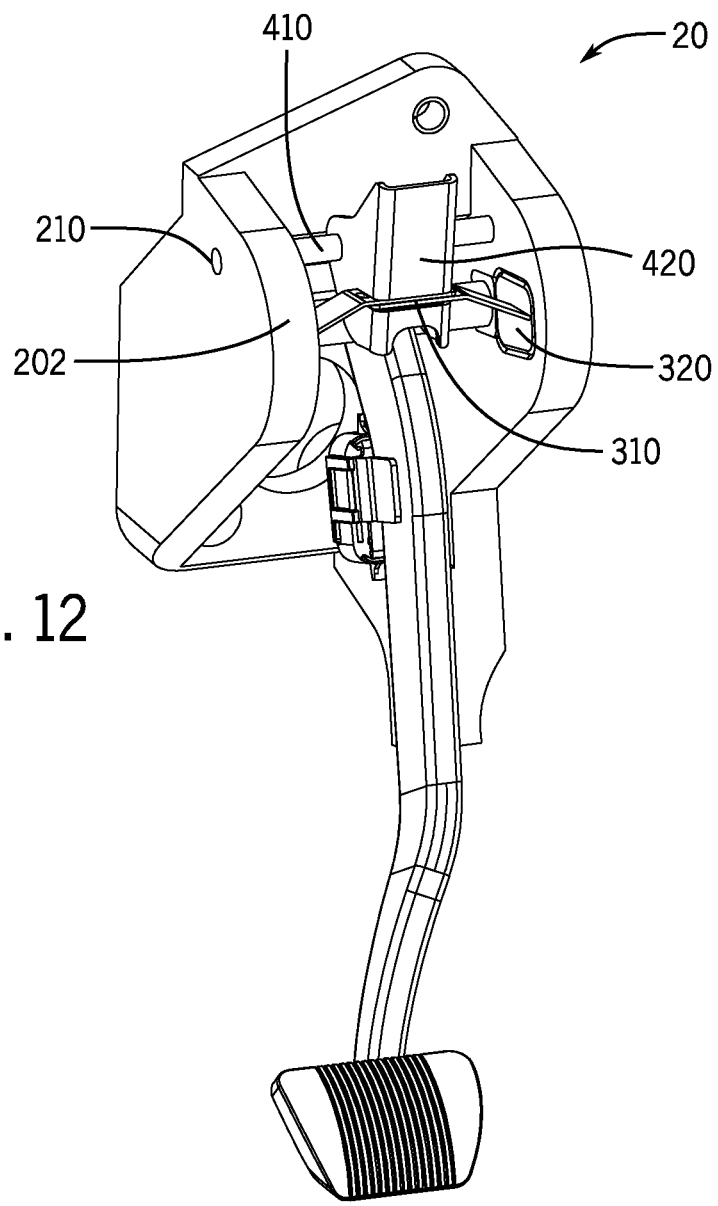
FIG. 12 is a perspective view of an exemplary embodiment of a pedal release system, according to the present disclosure.
Figure 13:
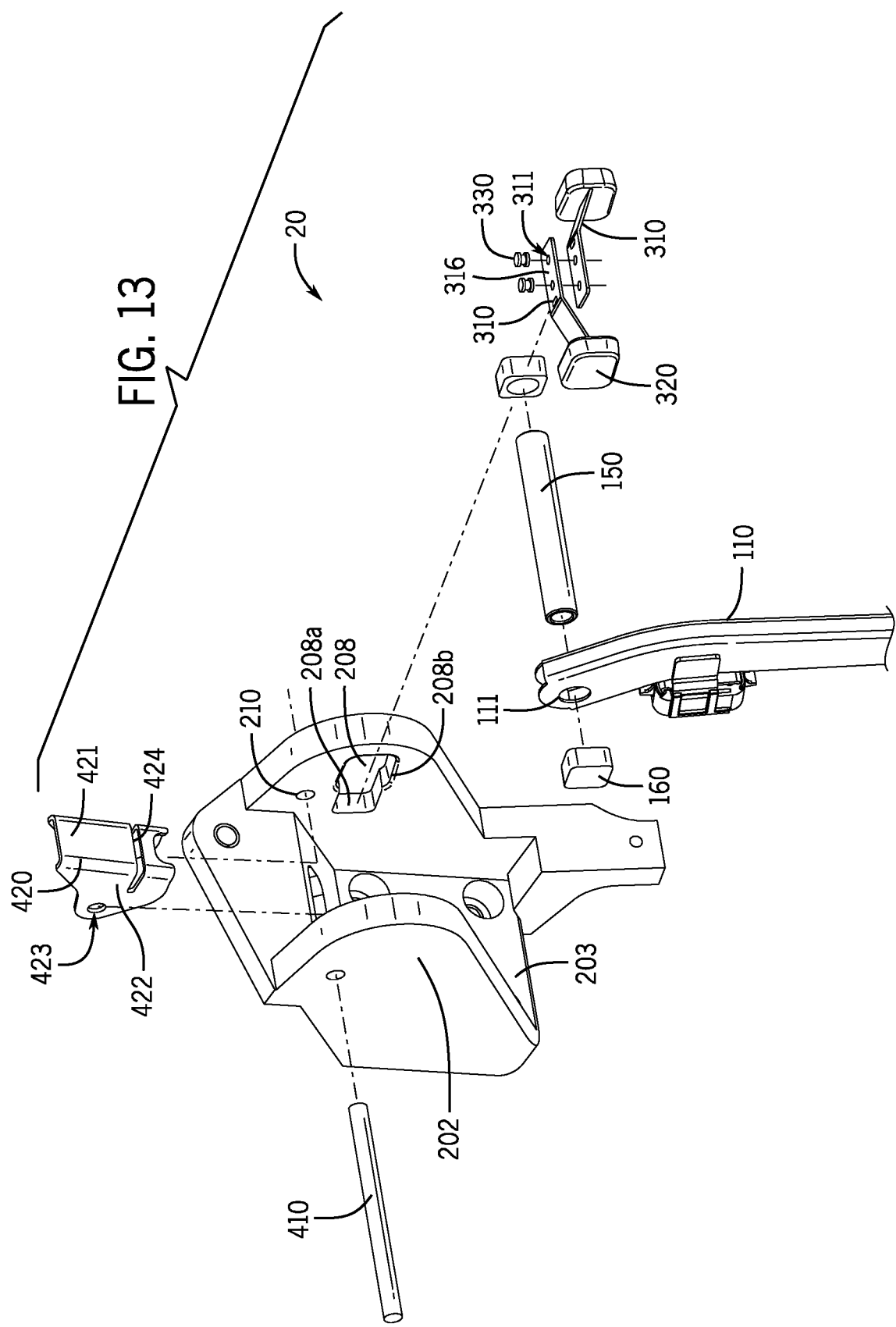
FIG. 13 is an exploded view of the pedal release system shown in FIG. 12.
Figure 15:
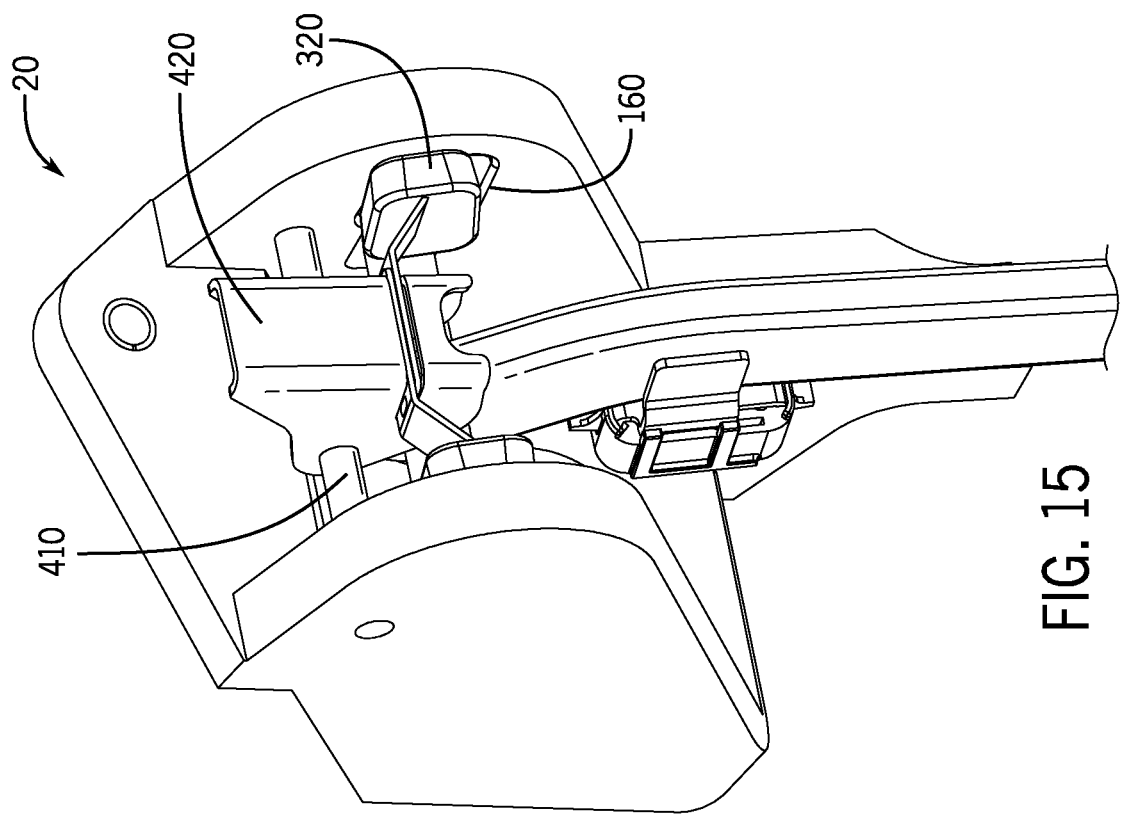
FIG. 15 is a perspective view of the pedal release system shown in FIG. 12 in second operating position.

FIGS. 12 and 13 illustrate another exemplary embodiment of a pedal release system 20 that includes a brake pedal assembly 100, a pedal housing assembly 200, a striker subassembly 300, and a secondary striker subassembly 400. The brake pedal assembly 100 (or part thereof) is housed within a pedal housing 201, and mechanically engages with the striker subassembly 300 and the secondary striker subassembly 400 to enable the brake pedal assembly 100 to swing freely, such as in the event if a threshold vehicle collision. The pedal release system 20 is similar to the pedal release system 10, described above, except with the addition of the secondary striker subassembly 400 allows for the pedal release system 20 to receive a force from above the pedal housing 201. In addition, because the illustrated brake pedal assembly 100 is substantially similar to the brake pedal assembly 100 described above, only the pedal housing assembly 200, the striker subassembly 300, and the secondary striker subassembly 400 of pedal release system 20 will be described below.

The pedal housing assembly 200 of the pedal release system 20 includes all of the same features and components as the pedal housing assembly 200 described above for the pedal release system 1 above, with the addition of a through hole 210 located in an upper portion of each side wall 202. Each illustrated hole 210 has a circular cross section and may be concentric on each side wall 202 to other holes 210.

The illustrated striker subassembly 300 of pedal release system 20 includes a striker bracket 310, striker plugs 320, and striker fasteners 330 (e.g., striker rivets). In some embodiments, the striker bracket 310, may instead be two or more striker brackets 310 which couple to function similar to a single striker bracket 310. For example, the striker brackets 310 may consist of a pair of mating striker brackets 310, which may be fixedly coupled by way of striker fasteners 330. The striker brackets 310, when coupled, may together form a top horizontal portion and may extend vertically downward at either end. The striker brackets 310 may include at least one through hole 311 on a top surface 316, which receives striker fasteners 330. The striker brackets 310 may fixedly couple to the striker plugs 320 at the outer ends. For example, an inner surface (i.e., closest to the striker brackets 310) of the striker plugs 320 may contain a slot within which to receive the ends of the striker brackets 310. In addition, while the striker brackets 310 and striker plugs 320 are described as separate components, the striker brackets 310 may alternatively be integrally formed with the striker plugs 320. The striker brackets 310 and the striker plugs 320 may be made of, for example, metal or plastic.

The illustrated secondary striker subassembly 400 includes a secondary pivot member 410 and a secondary striker bracket 420. The secondary pivot member 410 is generally cylindrical in shape. In some embodiments, the secondary pivot member 410 may be hollow. The illustrated secondary striker bracket 420 includes a base 421 connecting a pair of parallel side walls 422 (e.g., flanges). Each side wall 422 includes a through hole 423, within which the secondary pivot member 410 is pivotally/rotatably received. The apertures 423 may have a circular cross section and be concentric with one another. In this way, the secondary striker bracket 420 is configured to rotate about the secondary pivot member 410. In addition, the base 421 of the secondary striker bracket 420 may further include an inward extending slot 424 disposed in a lower portion of the secondary striker bracket 420. The slot 424 may extend the entire width of the secondary striker bracket 420, and accordingly, may extend into a portion of the side walls 422.

The illustrated brake pedal assembly 100, striker subassembly 300, and secondary striker subassembly 400 are all at least partially disposed within the pedal housing assembly 200. However, an upper portion of the secondary striker bracket 420 may extend above the top of the pedal housing assembly 200. During installation, the striker brackets 310 may be coupled by way of the striker fasteners 330, as described above. The striker plugs 320 may be coupled to the outer ends of the striker brackets 310. The striker bracket 310 may be received within the slot 424 of the secondary striker bracket 420. In this way, the striker subassembly 300, being coupled to the secondary striker bracket 420, may also be configured to pivot about the secondary pivot member 410. The secondary striker bracket 420 is accordingly disposed substantially over the brake pedal arm 110.

The striker plugs 320 are received within the pockets 208 of the pedal housing 201. Specifically, the second portion 208b of the pocket 208 have substantially the same general size and shape as the perimeter of the striker plug 320. In this way, the striker plugs 320 can be press fit or received within the second portion 208b of the pocket 208. The pivot bushing 160 are received within the first portion 208a of the pocket 208. In this way, the pivot bushings 160 and striker plugs 320 may abut one another within the pocket 208 when installed. When the brake pedal assembly 100 is installed in this way, the pivot member 150 extends generally parallel to the forward wall 203 of the pedal housing 201. Since the brake pedal assembly 100 is configured to pivot about the pivot member 150, for example, the brake pedal assembly 100 may rotate forward (i.e., towards the front of the vehicle), such that the pedal plate 120 would rotate towards the forward wall 203 of the pedal housing 201 when a user applies a force to the pedal plate 120. The booster rod (not shown), being installed forward of the brake pedal assembly 100, would conversely apply a force to the booster rod retainer (140). In addition, the ends of the secondary pivot member 410 may be rotatably/pivotally received within the apertures 210 of the side walls 202 of the pedal housing 201. In this way, secondary pivot member 410 extends generally parallel to the forward wall 203 of the pedal housing 201.

Figure 14:
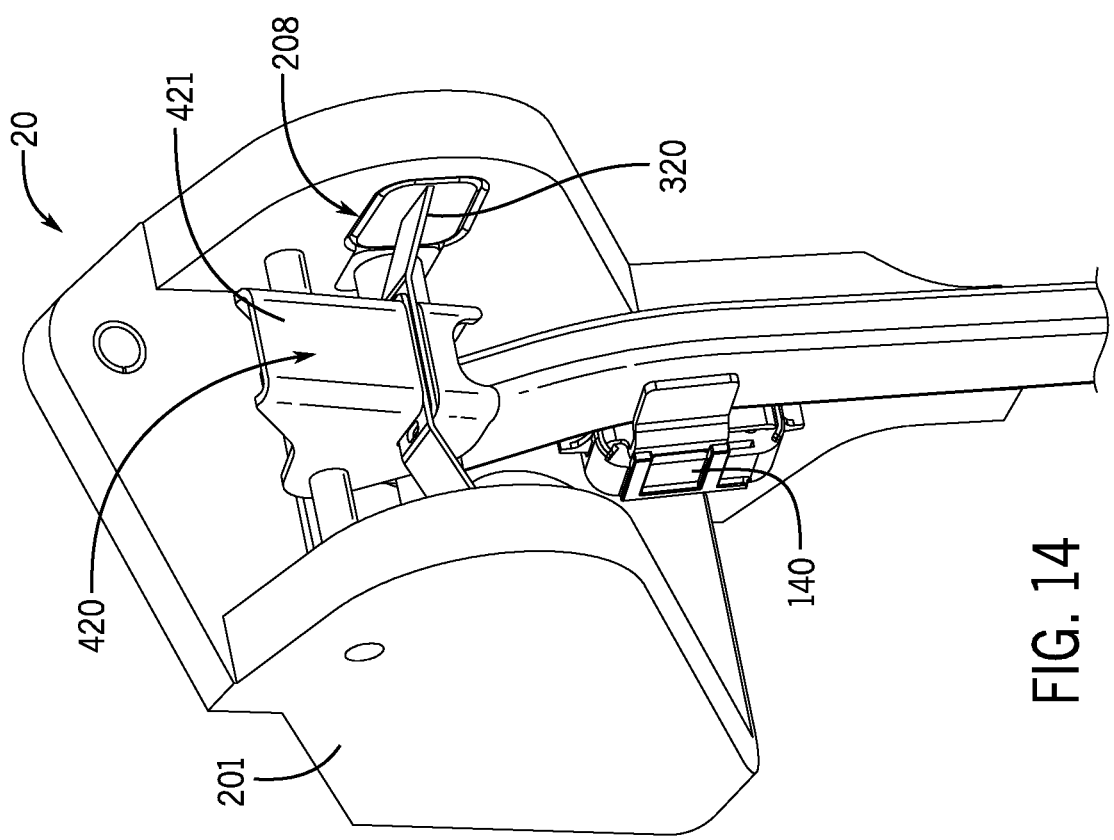
FIG. 14 is a perspective view of the pedal release system shown in FIG. 12 in a first (e.g., an initial) operating position.

Referring now to FIGS. 14-17, an illustration of the operation of the pedal release system 20 during a collision event is provided. In the event of an impact to the front of the vehicle, the pedal housing 201 is forced rearward (i.e., into the passenger cabin of the vehicle), causing an upper portion of a surface of the base 421 of the secondary striker bracket 420 to apply a force into an instrument panel (not shown). As the upper portion of the secondary striker bracket 420 and instrument panel collide, the secondary striker bracket 420 is forced to rotate about the secondary pivot member 410. For example, the top of the bracket 420 may rotate toward the housing and the bottom of the bracket 420 may rotate away from the housing. In addition, the rearward force from the booster rod (not shown) onto the booster rod retainer 140 may cause a rearward force to be exerted by the brake pedal assembly 100. In this way, the pivot member 150 and pivot bushings 160 may apply a rearward force against the striker plugs 320 within the pockets 208 of the pedal housing 201. This force may cause both the pivot bushings 160 and the striker plugs 320 to translate rearward within the pockets 208, and abut a rearward end of the pockets 208 (FIG. 14).

Figure 17:
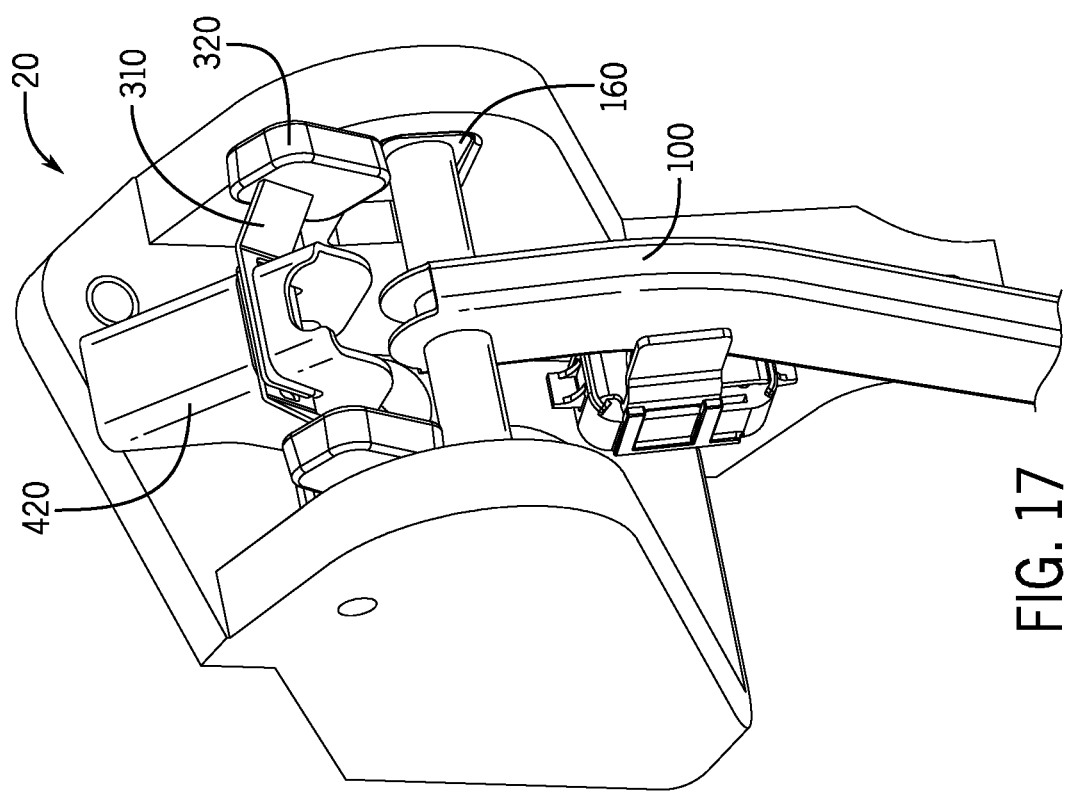
FIG. 17 is a perspective view of the pedal release system shown in FIG. 12 in a fourth (e.g., a final) operating position.
Figure 16:
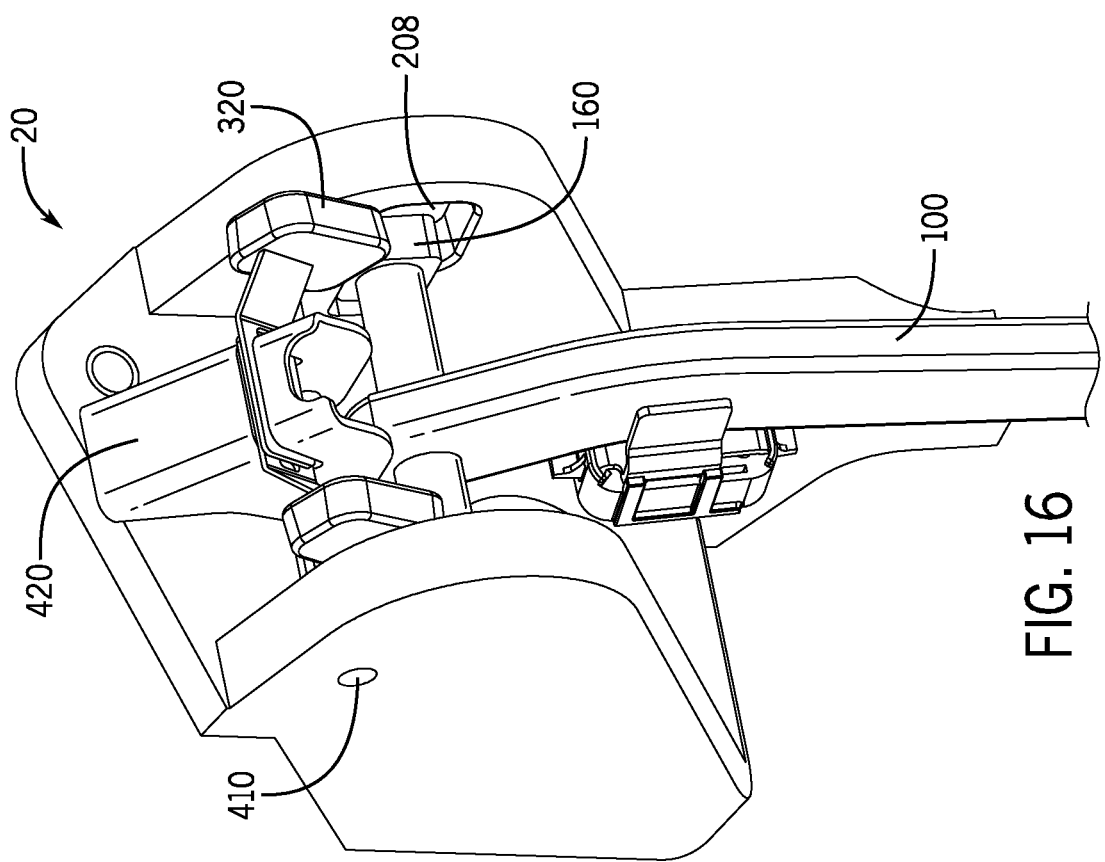
FIG. 16 is a perspective view of the pedal release system shown in FIG. 12 in a third operating position.

As shown in FIGS. 16 and 17, the secondary striker subassembly 400 pivots about the secondary pivot member 410 as a result of the force applied to the upper portion of the secondary striker bracket 420, coupled with the force from the brake pedal assembly 100, by way of the pivot bushings 160 abutting the striker plugs 320. As this occurs, the striker bracket 310, being coupled to the secondary striker bracket 420, may compress inward, such that the striker plugs 320 are able to disengage from the pocket 208 and the striker bracket 310 may rotate with the secondary striker subassembly 400. In other words, the rearward translational force applied to the striker plugs 320, coupled with the decreasing holding pressure from the striker brackets 310 allows the striker plugs 320 to begin to removably disengage from the pocket 208. Eventually, the striker brackets 310 allow the striker plugs 320 to fully disengage from the pockets 208, and the translational rearward force from the pivot bushings 160 may push the striker plugs 320 out of the pockets 208. The pivot bushings 160 are then able to slide from the first portion 208a to the second portion 208b, which was previously occupied by the striker plugs 320. The second portion 208b may have a large surface area than that of the first portion 208a. In this way, when the pivot bushings 160 are moved into the second portion 208b, the pedal arm is able to rotate toward (or to) the floor to effectively disengage as discussed above. In this way, the disengagement of the brake pedal assembly 100 may prevent the pedal release system 10 from acting as a rigid member by exerting the force of the collision through the brake pedal assembly 100, as it may when it is engaged.

Figure 18:
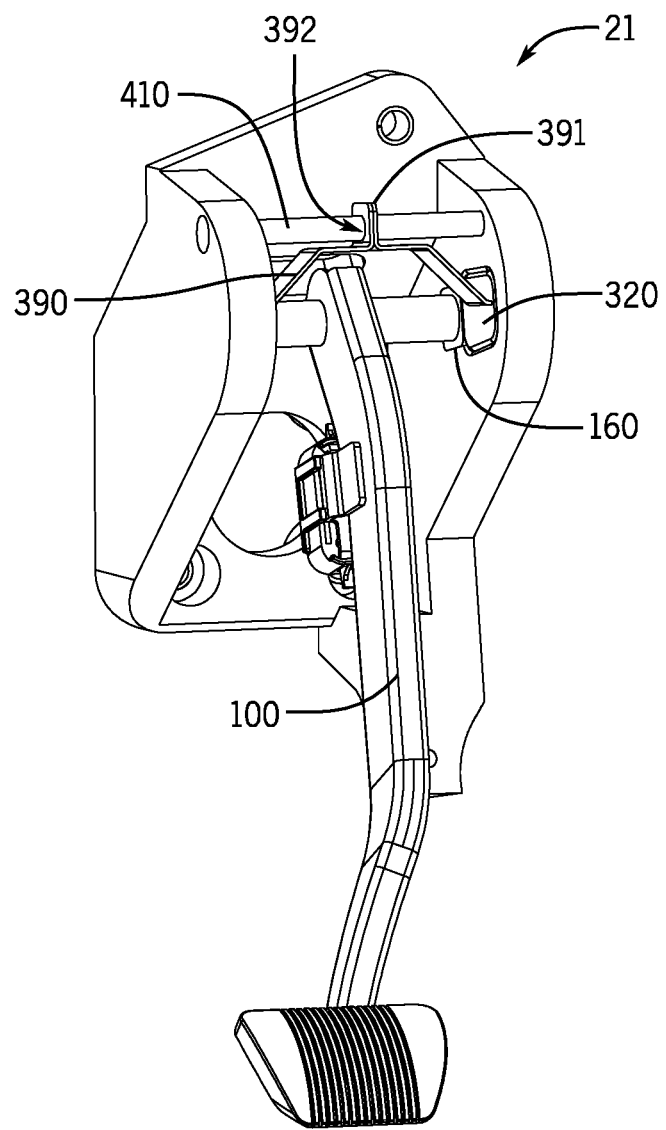
FIG. 18 is a perspective view of an alternate embodiment of the pedal release system shown in FIG. 12, according to the present disclosure.

FIG. 18 illustrates an exemplary embodiment of a pedal release system 21, which is shown similar to pedal release system 20 described above, except where noted. For example, the pedal release system 21 includes striker brackets 390 instead of striker bracket 310. Striker bracket 390 include a pair of mating striker brackets 390 having an upper flange 391, each of which having an aperture 392. Each aperture 392 has a circular cross section and may rotatably receive the secondary pivot member 410. The striker brackets 390, when coupled, may together form a top horizontal portion and may extend vertically downward at either end. The striker brackets 390 may fixedly couple to the striker plugs 320 at the outer ends. For example, an inner surface (i.e., closest to the striker brackets 390) of the striker plugs 320 may contain a slot within which to receive the ends of the striker brackets 390. In operation, the pedal release system 21 can operate in substantially the same way as pedal release system 20. However, because a secondary striker bracket 420 is omitted from the pedal release system 21, a threshold force from the brake pedal assembly 100, as exerted through the pivot bushings 160, is configured to disengage the striker plugs 320. When this occurs, the striker bracket 390 may pivot upward about the secondary pivot member 410 to allow the brake pedal assembly 100 to operatively disengage by moving toward (or to) the floor of the vehicle.

Figure 19:
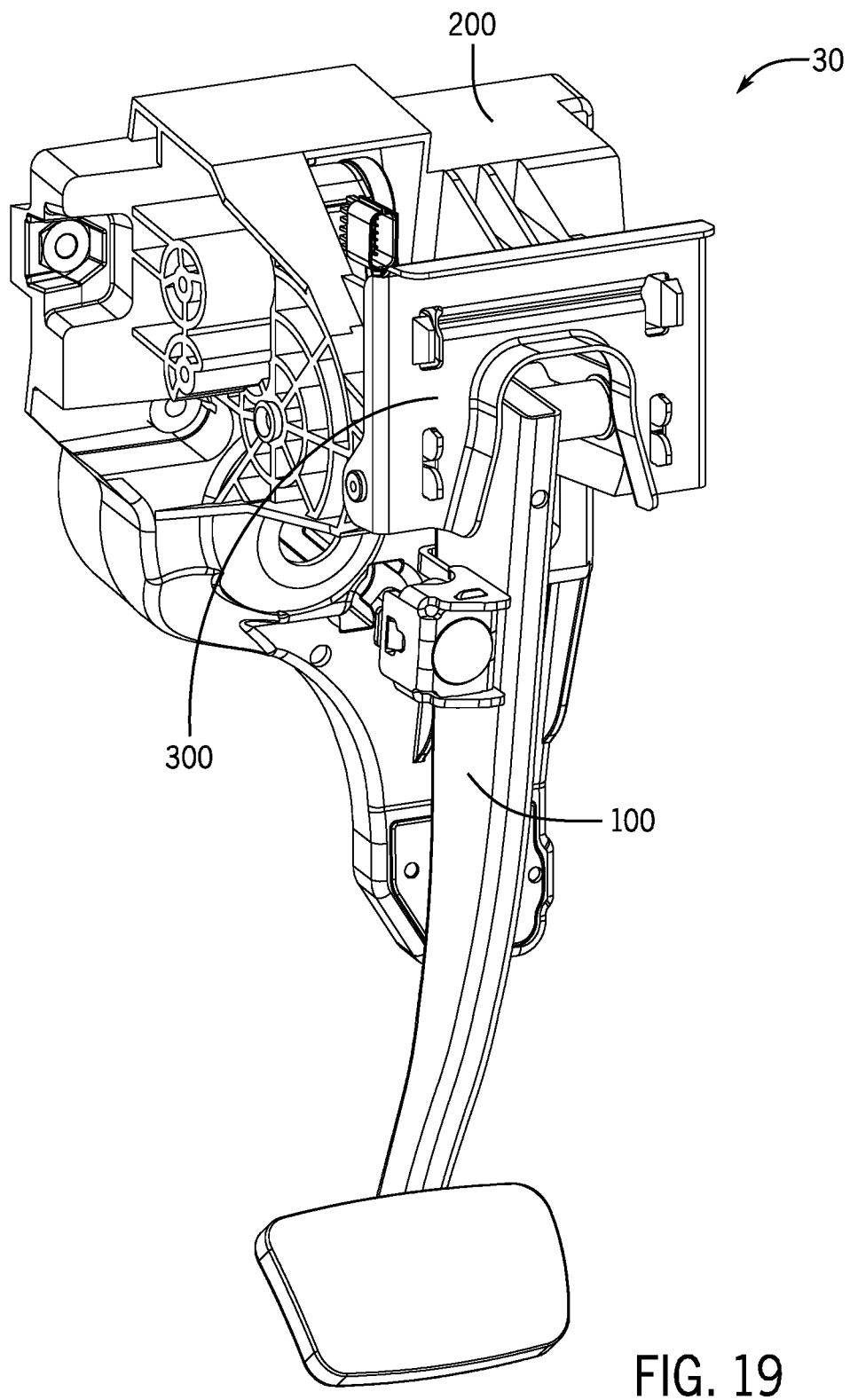
FIG. 19 is a perspective view of an exemplary embodiment of a pedal release system, according to the present disclosure.
Figure 20:
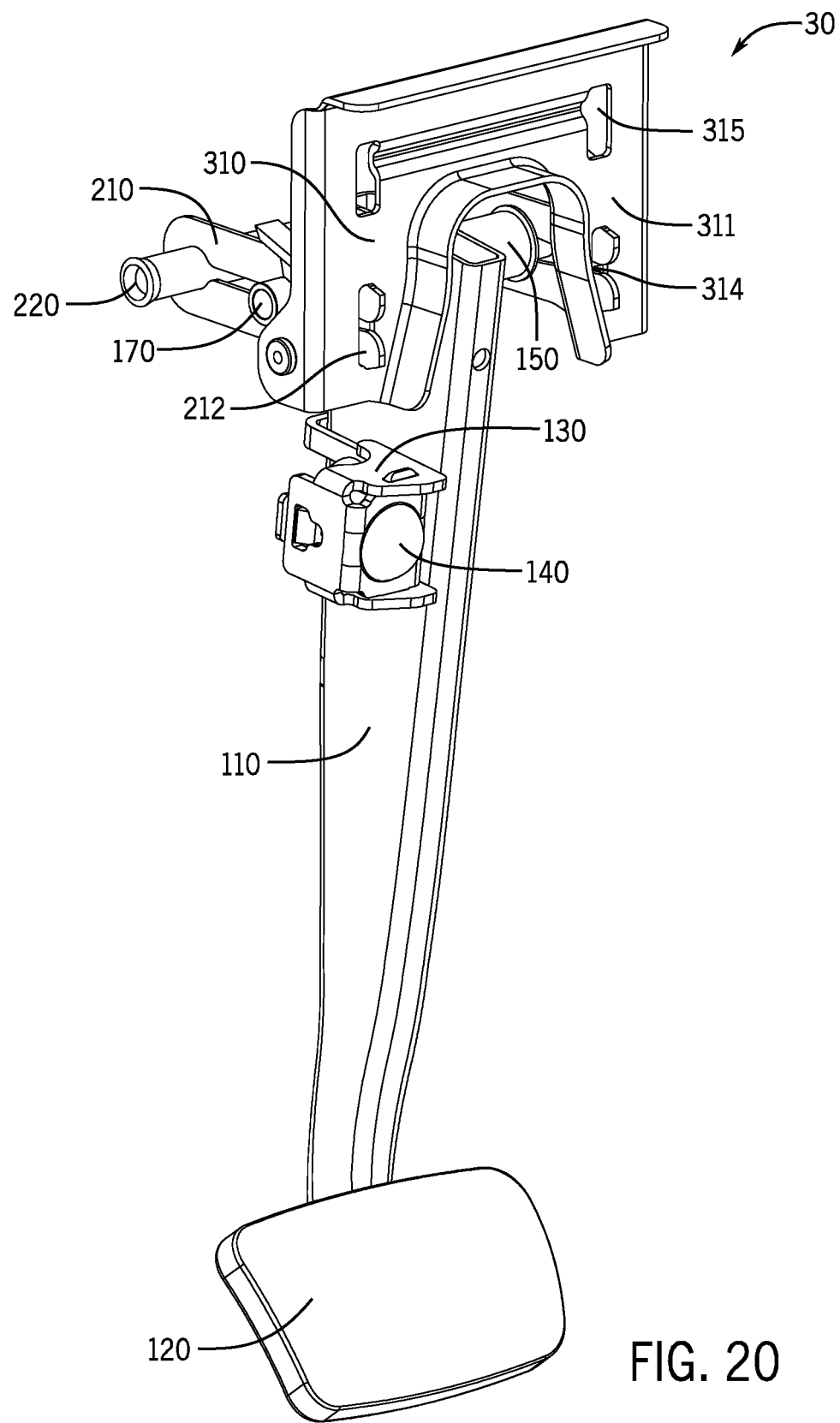
FIG. 20 is an exploded view of the pedal release system shown in FIG. 19.
Figure 21:
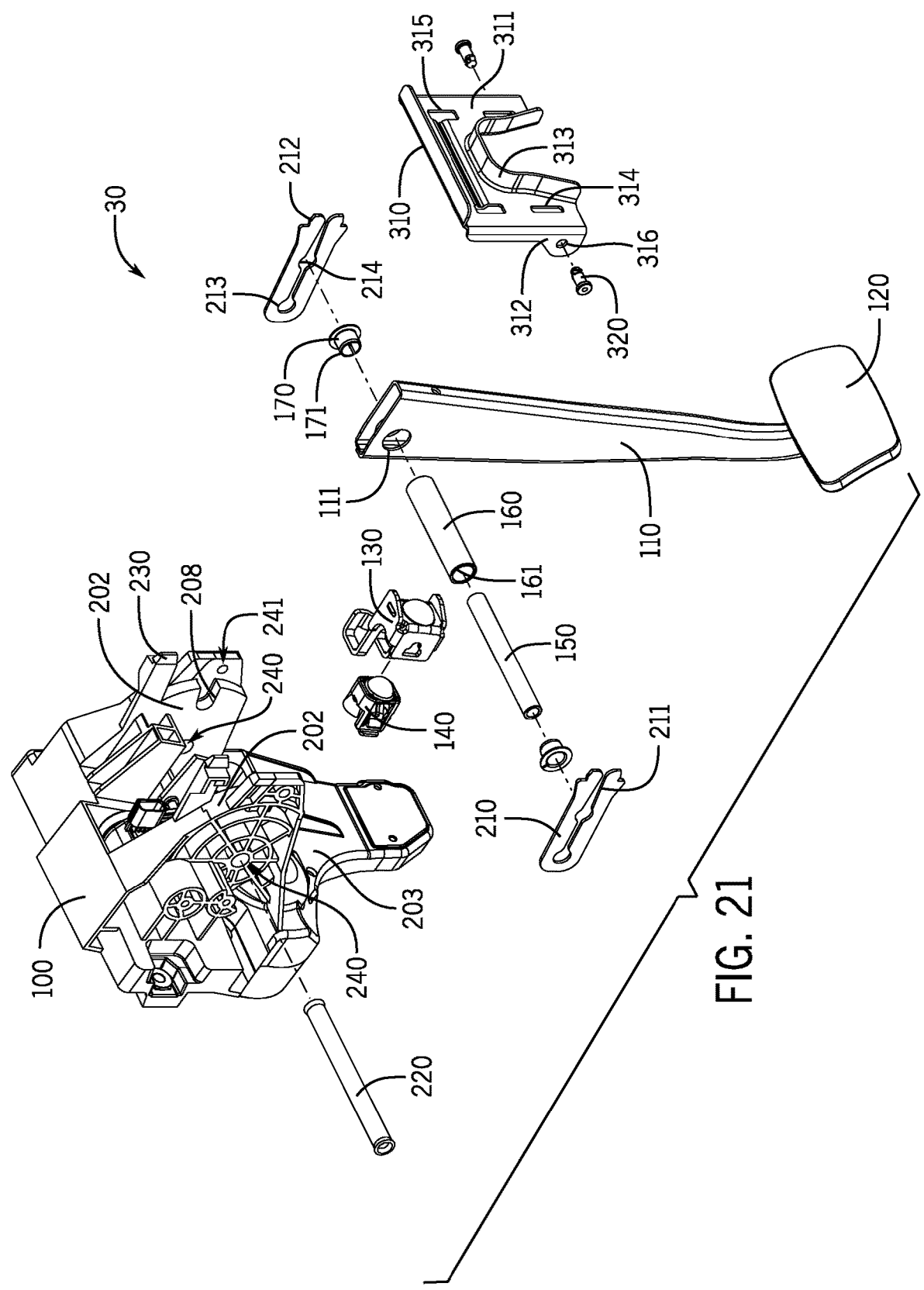
FIG. 21 is a perspective view of the pedal release system shown in FIG. 19 omitting the pedal assembly module housing to provide greater detail.
Figure 23:
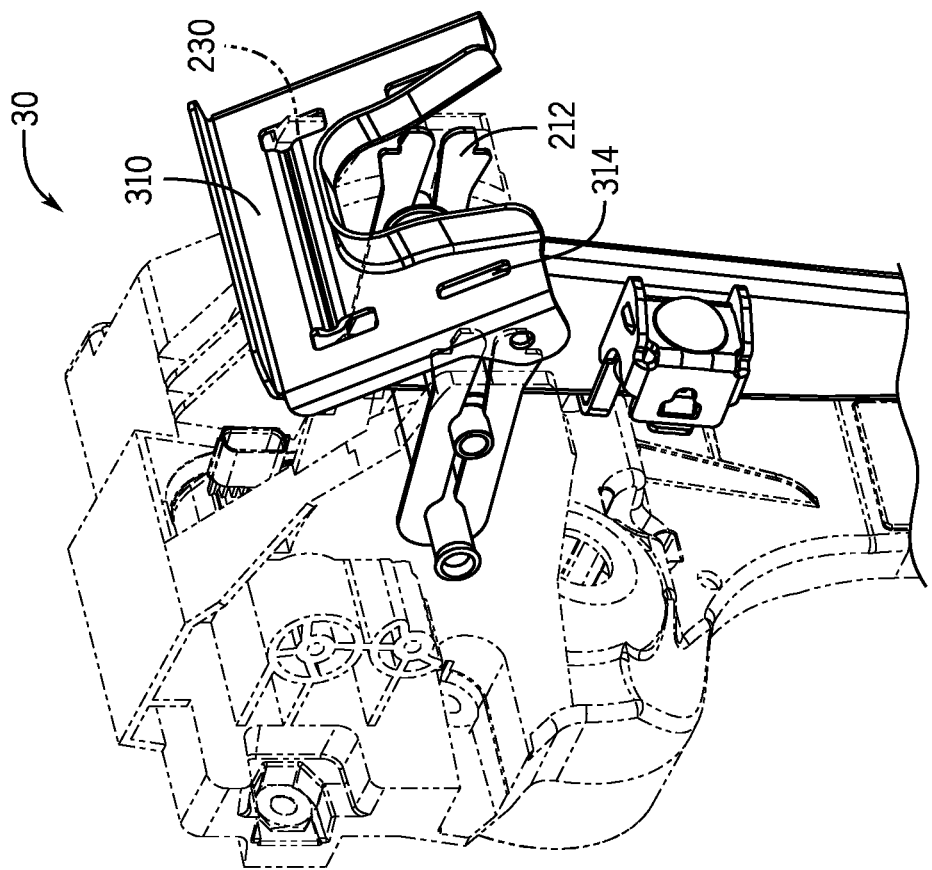
FIG. 23 is a perspective view of the pedal release system shown in FIG. 19 in a second operating position.
Figure 22:
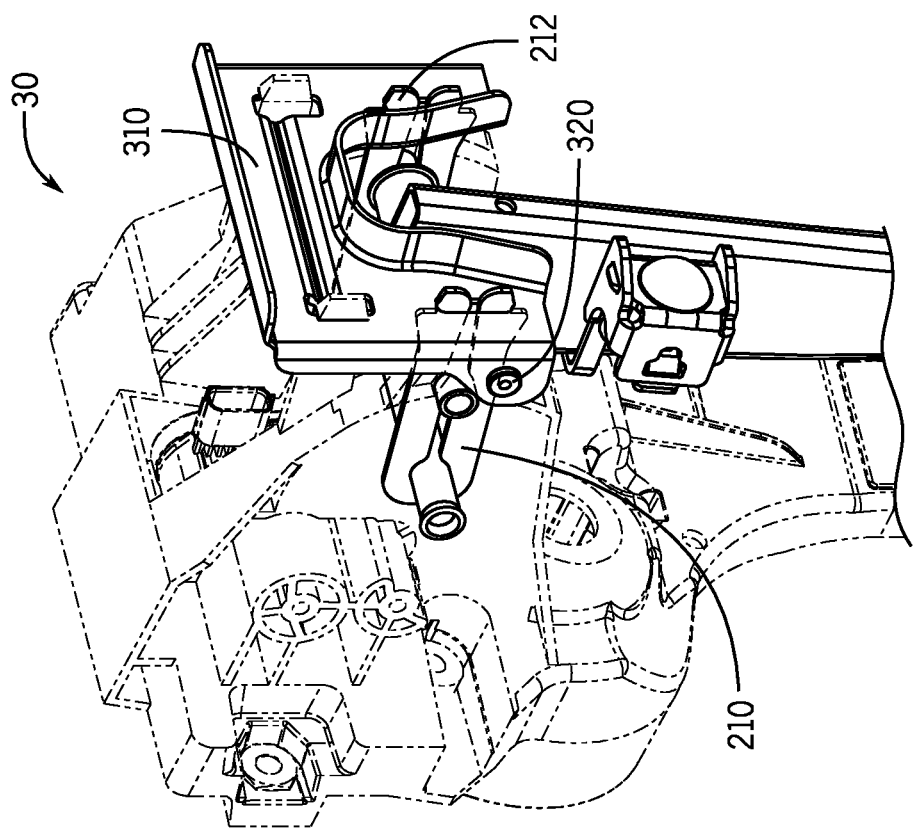
FIG. 22 is a perspective view of the pedal release system shown in FIG. 19 in an initial operating position.
Figure 25:
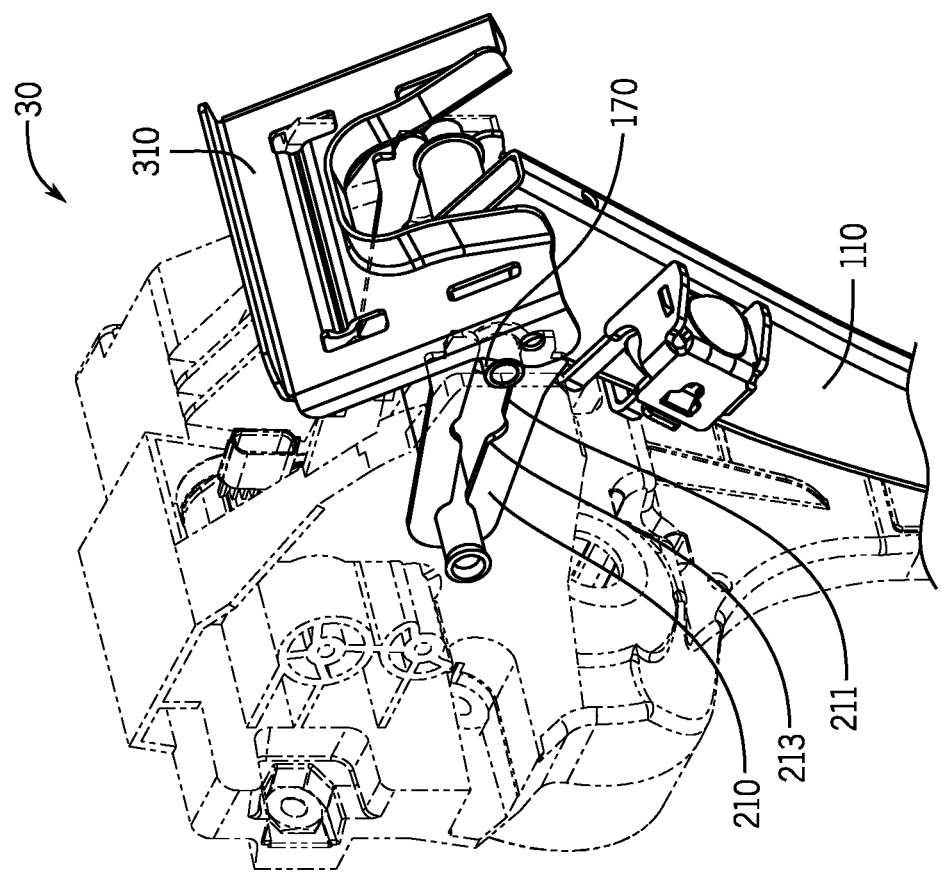
FIG. 25 is a perspective view of the pedal release system shown in FIG. 19 in a final operating position.
Figure 24:
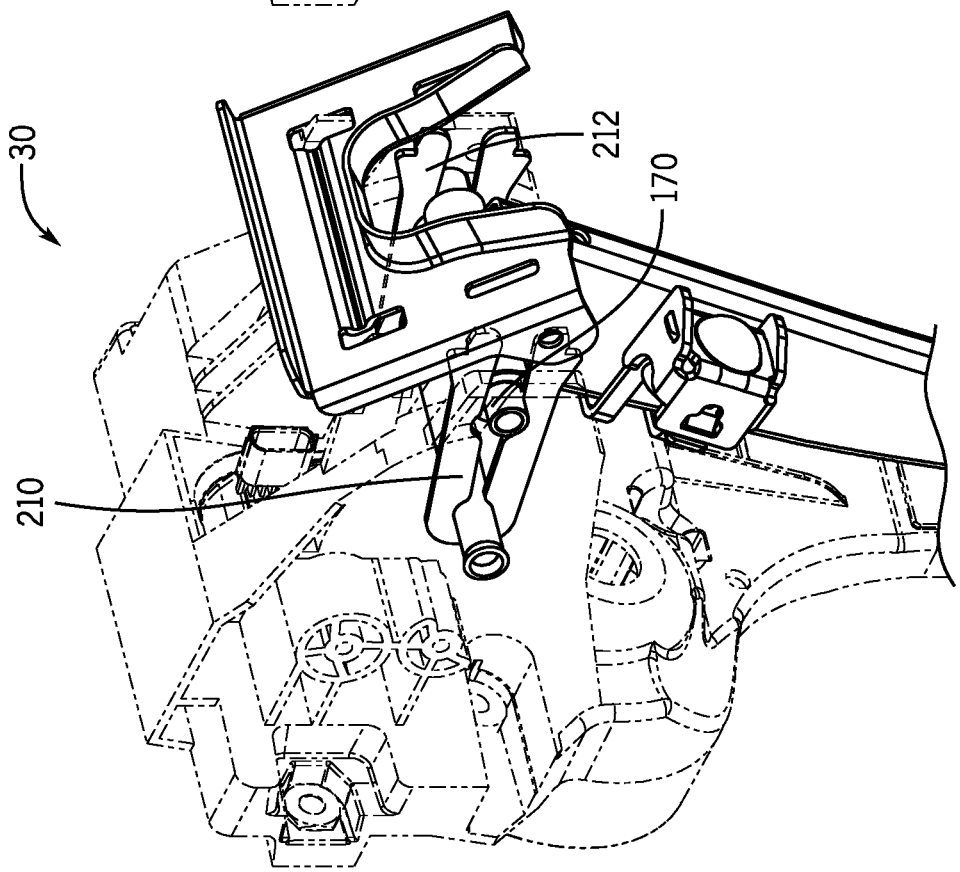
FIG. 24 is a perspective view of the pedal release system shown in FIG. 19 in a third operating position.

FIGS. 19-21 illustrate an exemplary embodiment of a pedal release system 30, which includes a brake pedal assembly 100, a pedal housing assembly 200, and a striker subassembly 300. The brake pedal assembly 100 is received by and operatively coupled to a pedal housing 201, and mechanically engages with the striker subassembly 300 to enable the brake pedal assembly 100 to swing freely in the event of a collision.

The illustrated brake pedal assembly 100 includes a brake pedal arm 110, a pedal plate 120, a booster rod retainer bracket 130, a booster rod retainer 140, a pivot member 150, a pivot tube 160, and pivot bushings 170. The pivot tube 160 is generally cylindrical with a through-going, concentric opening 161 (i.e., the pivot tube 160 may be hollow). The illustrated opening 161 has a circular cross section, and the pivot member 150 is shown generally cylindrical. The pivot member 150 may be at least as long as the pivot tube 160. The size (e.g., radius) of the pivot member 150 may be smaller than the radius of the opening 161 (e.g., bore) of the pivot tube 160, such that the pivot member 150 is received within the opening 161 of the pivot tube 160. The pivot member 150 can extend beyond each outer end of the pivot tube 160.

The brake pedal arm 110 includes a through hole 111 at an upper end of the brake pedal arm 110, within which the pivot tube 160 is received (e.g., rotatably/pivotably received). The pedal plate 120 is disposed at a lower end of the brake pedal arm 110 and is configured to receive a force or input from a driver. The booster rod retainer bracket 130 is fixedly coupled to a forward (i.e., closest to the front of the vehicle) side of the brake pedal arm 110. The booster rod retainer bracket 130 receives and couples to the booster rod retainer 140. The booster rod retainer 140 is configured to receive a force from a booster rod (not shown). The pedal plate 120, the booster rod retainer bracket 130, the pivot member 150, and the pivot tube 160 may be made of, for example, metal, or other similar material. The brake pedal arm 110 may be, for example, hollow, or a solid metal stamping. The booster rod retainer 140 and the pivot bushings 160 may be made of, for example, plastic, or other similar material.

The through hole 111 of the brake pedal arm 110 extends through the sides of the brake pedal arm 110, and has a circular cross section. The pivot tube 160 may extend through the through hole 111. The pivot tube 160 can be coupled (e.g., welded) to the brake pedal arm 110 such that they rotate together as one. A pair of pivot bushings 170 may be coupled to either end of the pivot tube 160, such that the brake pedal arm 110, the pivot tube 160 and the bushings 170 rotate together about (e.g., relative to) the pivot member 150. Each pivot bushing 170 has a recess 171 (e.g., bore) in an end surface (i.e., the surface closest to the brake pedal arm 110) of a shoulder, where each recess 171 receives one end of the pivot tube 160.

The pedal housing assembly 200 may include a pedal housing 201, a pair of side plates 210, and a support member 220. The pedal housing 201 may include a pair of parallel vertically extending side walls 202, which are connected by a vertically extending forward wall 203. The pedal housing 201 may be made of, for example, plastic with metal inserts, or metal. The pedal housing assembly 200 may be fixedly coupled to the dash of a vehicle by securing the forward wall 203 of the pedal housing 201 to the dash or other forward structure of the vehicle. The support member 220 may have a generally cylindrical shape, and may be made of, for example, metal. The side plates 210 may be made of, for example, a plastic, a metal, a composite or any suitable material, and may be at least partially deformable and/or elastic. The side plates 210 may be generally horizontally extending, and may include a forward extending slot 211 extending from a front end of the side plate 210. The slot 211 may extend from the front end and may terminate into a first groove 213 near a forward end of the side plate 210. The first groove 213 may have a generally circular cross section. Between the front end of the side plates 210 and the first groove 213 there may be a second groove 214 disposed on the slot 211. The second groove may also have a circular cross section. The front end of the side plates 210 may further include rearward extending protrusions 212.

Each illustrated side wall 202 includes a side support member 230, such as at an upper portion thereof. The side support members 230 may be parallel, rearward extending protrusions. Each side wall 202 includes an aperture 240, which are shown having circular cross sections that receive the support member 220. The radius of the aperture 240 may be at least as large as the radius of the support member 220, such that the apertures 240 may receive portions (e.g., ends) of the support member 220. When installed, the support member 220 may be generally parallel to the forward wall 203 of the pedal housing 201. The side walls 202 may each also include a pocket 208 integrally formed on an inner surface of each side wall 202. The pockets 208 may have a top and bottom surface which may extend substantially parallel from one another, and may extend to a rearward end of the side wall 202. The pocket may have substantially the same general size and shape as the perimeter of the pivot bushings 170. In this way, the pivot bushings 170 may be at least partially received within the pockets 208. In addition, each side wall 202 may include a second through-going aperture 241 (e.g., thru hole), which is shown disposed at a lower, rearward portion of each side wall 202. The apertures 241 may have a generally circular cross section.

The striker subassembly 300 may include a striker bracket 310 and striker shear pins 320. The striker bracket 310 may have a front wall 311 and two parallel side walls 312 and may extend generally vertically. The front wall 311 of the striker bracket 310 may contain an opening 313 in the center of the bracket and extending upward from a bottom end. The front wall 311 of the strike bracket 310 may further include a pair of lower parallel slots 314 and a pair of upper parallel slots 315. The side walls 312 may each include corresponding through-going apertures 316. The apertures 316 may have a circular cross section, and may be configured to each receive a striker shear pin 320. The striker shear pins 320 may have a generally cylindrical body. The striker bracket 310 may be made of, for example, metal or plastic, and the striker shear pins 320 may be made of plastic.

The brake pedal assembly 100 and striker subassembly 300 may both be at least partially disposed within the pedal housing assembly 200. During installation, the support member 220 is received within the apertures 240 of the side walls 202 of the pedal housing 201. The side plates 210 may each abut an inner surface of the side walls 202 of the pedal housing 201. The first groove 213 of the side plates 210 may each receive the support member 220. The side support members 230 are generally sized to receive slots 315. The striker plate 310 receive the striker shear pins 320 through the apertures 316 in the side walls 312. In addition, the striker shear pins 320 may extend through and be received within the second apertures 241 of the side walls 202 of the pedal housing 201. In this way, the striker assembly 300 is operatively coupled to the pedal housing assembly 200. In addition, the lower slots 314 of the striker bracket 310 receive the rearward protrusions 212 of the side plates 210, and the upper slots 315 of the striker bracket 310 receive the side support members 230 of the pedal housing 201.

The brake pedal arm 110 may be disposed generally below the opening 313 of the striker bracket 310. The pivot bushings 170 can be located between the side plates 210 (or according to other embodiments, can be received in the second groove 214 of the side plates 210). The outer ends of the pivot member 150 is received within the pockets 208 of the pedal housing 201. When the brake pedal assembly 100 is installed in this way, the pivot member 150 extends generally parallel to the forward wall 203 of the pedal housing 201. Since the brake pedal assembly 100 is configured to pivot about the pivot member 150, for example, the brake pedal assembly 100 may rotate forward (i.e., towards the front of the vehicle), such that the pedal plate 120 would rotate towards the forward wall 203 of the pedal housing 201 when a user applies a force to the pedal plate 120. The booster rod (not shown), being installed forward of the brake pedal assembly 100, would conversely apply a force to the booster rod retainer (140).

In some embodiments the pedal housing 201 may be made of plastic, and the side plates 210, pivot member 150 (e.g., pivot pin, etc.), and support member 220 may be made of metal. In this way, the material selection (i.e., metal components within a plastic housing) may beneficially provide structural support and increased rigidity. It should be appreciated that the benefits of such a material selection may extend beyond pedal release system 30.

FIGS. 22-25 illustrate the operation of the pedal release system 30 during a collision event is provided. In the event of an impact to the front of the vehicle, the pedal housing 201 is forced rearward (i.e., into the passenger cabin of the vehicle), causing an upper portion of the front wall 311 of the striker bracket 310 to apply a force into an instrument panel (not shown). As the upper portion of the striker bracket 310 and instrument panel collide, the upper portion of the striker bracket 310 is forced to rotate forward as the rearward protrusions 212 prevent the lower portion of the striker bracket from being forced forward. Due the rotation of the striker bracket 310, the striker shear pins 320 shear as the lower portion of the striker bracket rotates upward. The support member 220 may hold the side plates 210 in place relative to the pedal housing 201 by remaining fixedly received within the first groove 213 of the side plates 210. As the lower portion of the striker bracket 310 rotates upward, the rearward protrusions 212 of the side plates 210 begin to disengage from the lower slots 314 of the striker bracket 310. In addition, the rearward force from the booster rod (not shown) onto the booster rod retainer 140 may cause a rearward force to be exerted by the brake pedal assembly 100. In this way, the pivot member 150 and pivot bushings 170 may apply a rearward force against the rearward side of the second groove 214 of the side plates 210.

As the rearward protrusions 212 of the side plates 210 were effectively clamping the slot 211 of the side plates 210 closed, as the rearward protrusions 212 have disengaged from the lower slots 314 of the striker bracket 310 they may begin to separate. In this way, the rearward force applied by the pivot member 150 on the rearward end of the second groove 214 may cause the slot to begin to expand. As the slot 211 expands, the rearward force from the pivot member 150 allows the pivot member 150 to disengage from the second groove and move within (e.g., traverse in) the slot 211 of the side plates 210 in a rearward direction, until it is able to completely disengage from the slot 211. In other words, as the pivot member 150 disengages, the pedal assembly 100 is able to rotate forward. The brake pedal assembly 100 may then effectively or operatively disengage from the original pivot axis and rotate freely about a new (e.g., second pivot axis) toward the floor of the vehicle. In this way, the operative release or disengagement of the brake pedal assembly 100 prevent the pedal release system 30 from acting as a rigid member by exerting the force of the collision through the brake pedal assembly 100, as it may when it is engaged.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, and/or illustrations of possible embodiments (and such terms are not intended to connote that such embodiments are necessarily extraordinary or superlative examples).

The term "coupled," as used herein, means the joining of two members directly or indirectly to one another. Such joining may be stationary (e.g., permanent or fixed) or moveable (e.g., removable or releasable). Such joining may be achieved with the two members coupled to each other, with the two members coupled with a separate intervening member and any additional intermediate members coupled with one another, or with the two members coupled together with an intervening member that is integrally formed as a single unitary body with one of the two members. Such members may be coupled mechanically, electrically, and/or fluidly.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the shelf assembly as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, the position of elements may be reversed or otherwise varied, and the nature or number of discrete elements or positions may be altered or varied. Any element disclosed in one embodiment may be incorporated or utilized with any other embodiment disclosed herein. Although one example of an element that can be incorporated or utilized in another embodiment has been described above, it should be appreciated that other elements of the various embodiments may be incorporated or utilized with any of the other embodiments disclosed herein.

What is claimed is:

1. An automobile pedal release system, comprising:
   a housing having a first side wall and a second side wall, which opposes and is spaced apart from the first side wall by a cleft, wherein each of the first and second side walls includes a pocket recessed into an inner surface of the associated side wall such that the two pockets oppose one another;
   a brake pedal assembly comprising a pivot member disposed in the cleft and defining a pivot axis, first and second bushings, and a brake pedal arm rotatable about the pivot axis relative to the two bushings, wherein each busing is disposed in a first portion of one of the two pockets and receives one of two ends of the pivot member; and
   a striker assembly comprising a striker and two plugs, the striker having an elongated body extending in the cleft between the first and second side walls, wherein each plug is disposed in a second portion of one of the two pockets and includes a bore that receives one of two ends of the striker.

2. The pedal release system of claim 1, wherein the striker includes a leg, which extends from each end of the body at a first angle relative to the body, and a foot, which extends from each leg at a second angle relative to the associated leg, wherein each foot is coupled to one of the two plugs.

3. The pedal release system of claim 2, wherein each side wall of the housing comprises a first protrusion extending inwardly from the inner surface and a second protrusion extending inwardly from the inner surface, the first and second protrusions of each side wall are separated by a channel, and each channel receives part of the striker.

4. The pedal release system of claim 3, wherein the striker is a plate having first and second surfaces that are opposite and substantially flat, the first surface faces the first protrusion, the second surface faces the second protrusion, and each plug is configured to dislodge from the associated pocket in response to a threshold load applied to one of the first and second surfaces.

5. The pedal release system of claim 4, wherein the striker comprises two separate portions; each portion comprises one of the legs, one of the feet, and a base that defines part of the body; the two bases are coupled together forming the body; and each channel receives part of one of the two bases.

6. The pedal release system of claim 2, wherein the body of the striker is a plate having first and second surfaces that are opposite and substantially flat, one of the first and second surfaces faces the brake pedal assembly, and each plug is configured to dislodge from the associated pocket in response to a threshold load applied to an edge of the body.

7. The pedal release system of claim 2, wherein the striker assembly comprises a plurality of strikers in a side by side arrangement, each bore in each plug receives one end of each striker of the plurality of strikers, and each plug is configured to dislodge from the associated pocket in response to a threshold load applied to the plurality of strikers.

8. The pedal release system of claim 1, wherein the pivot member is a first pivot member, the pivot axis is a first pivot axis, and the system further comprises:
   a second pivot member disposed in the cleft and defining a second pivot axis, which is configured to be parallel to the first pivot axis; and
   a bracket having a base and a flange extending from the base, the flange having a pivot hole that receives the second pivot member to rotatably couple the bracket to the second pivot member, wherein the bracket includes a slot that receives the body of the striker.

9. The pedal release system of claim 8, wherein each plug is configured to dislodge from the associated pocket in response to a predetermined movement of the striker in response to a rotation of the bracket relative to the housing.

10. The pedal release system of claim 9, wherein each side wall includes an opening that receives one end of the second pivot member, the bracket has two flanges that form a clevis with the base, each flange has the pivot hole that receives the second pivot member, and a portion of the brake pedal arm is received between the two flanges.

11. The pedal release system of claim 1, wherein the plugs, the bushings, or both the plugs and the bushings are press fit into the associated portion of the pocket, and each plug abuts one bushing in the associated pocket.

12. The pedal release system of claim 11, wherein the plugs are configured to dislodge from the associated pocket in response to a threshold load applied to the striker or a threshold movement of the striker relative to the housing.

13. The pedal release system of claim 1, wherein the plugs are configured to dislodge from the associated pocket in response to a threshold load applied to the striker or a threshold movement of the striker relative to the housing.

14. The pedal release system of claim 13, wherein the brake pedal assembly further comprises a rod retainer bracket coupled to a forward facing side of the brake pedal arm, and wherein the rod retainer bracket is configured to receive a force from a rod.

15. The pedal release system of claim 1, wherein at least one of the plugs and the bushings are configured to slide in a direction within the pockets in response to a threshold load applied to at least one of the brake pedal assembly and the striker assembly.

16. The pedal release system of claim 15, wherein the direction is horizontal, the plugs slide in the horizontal direction in response to the threshold load applied to the striker assembly, and the bushings slide in the horizontal direction in response to the threshold load applied to the brake pedal assembly.

17. The pedal release system of claim 1, wherein the pivot member is a first pivot member, the pivot axis is a first pivot axis, and the system further comprises a second pivot member disposed in the cleft and defining a second pivot axis, which is configured to be parallel to the first pivot axis, wherein striker assembly comprises two striker brackets, each striker bracket has a first end coupled to one of the two plugs and a second end coupled to the second pivot member, and the first end of each striker bracket includes an opening that receives the second pivot member.

* * * * *